(12) United States Patent
Pandit et al.

(10) Patent No.: US 7,503,038 B2
(45) Date of Patent: Mar. 10, 2009

(54) SYSTEM AND METHOD FOR SEAMLESSLY COMPARING OBJECTS

(75) Inventors: Bhalchandra S. Pandit, Redmond, WA (US); Bradford R. Daniels, Redmond, WA (US); James W. Truher, III, Bellevue, WA (US); Jeffrey P. Snover, Woodinville, WA (US); Jonathan S. Newman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 945 days.

(21) Appl. No.: 10/928,652

(22) Filed: Aug. 27, 2004

(65) Prior Publication Data

US 2006/0047652 A1    Mar. 2, 2006

(51) Int. Cl.
*G06F 9/45* (2006.01)
(52) U.S. Cl. ............... 717/126; 717/139; 717/141; 717/143; 717/146
(58) Field of Classification Search ............... None
See application file for complete search history.

(56) References Cited

U.S. PATENT DOCUMENTS

| 5,581,760 | A  | * | 12/1996 | Atkinson et al. | ............ 717/108 |
| 6,829,733 | B2 | * | 12/2004 | Richardson et al. | ............ 714/38 |
| 7,035,866 | B1 | * | 4/2006  | Chen et al. | ............ 707/102 |
| 7,155,706 | B2 | * | 12/2006 | Snover et al. | ............ 717/143 |
| 7,353,510 | B2 | * | 4/2008  | Noirot-Nerin | ............ 717/175 |
| 2003/0237074 | A1 |   | 12/2003 | Borson |  |

OTHER PUBLICATIONS

Bouchon-Meunier, B., "Towards General Measures of Comparison of Objects", Fuzzy Sets and Systems, vol. 84, No. 2, pp. 143-153, Feb. 1996.
"Free BSD Hypertext Man Pages", retrieved at <<http://www.freebsd.org/cgi/man.cgi?query=diff&apropos=0&sektion=0&manpath=SuSE+Linux%2Fi386+7.0&format=htmll>> on Oct. 10, 2002, 6 pgs.
EP Search Report For European Patent Application No. 05107773.3 mailed on Nov. 19, 2007, 7 pgs.

* cited by examiner

*Primary Examiner*—Chuck O Kendall
(74) *Attorney, Agent, or Firm*—Lee & Hayes, PLLC

(57) ABSTRACT

The present comparison technique operates on objects having the same type, similar types, or different types. Multiple comparison objects may be compared against one or more reference objects. The comparison objects may be obtained from a prior cmdlet in a pipeline of cmdlets operating in an object-based environment. The reference object and comparison object may be compared in an order-based manner or in a key-based manner. In addition, specific properties may be specified which will identify which properties of the reference object and the comparison object to compare during the comparison. The comparison may generate an output that identifies the difference and/or similarities. The output may be pipelined to another cmdlet for further processing.

40 Claims, 23 Drawing Sheets

SYSTEM AND METHOD FOR SEAMLESSLY COMPARING OBJECTS

TECHNICAL FIELD

Subject matter disclosed herein relates to computer-implemented comparison techniques, and in particular to computer-implemented comparison techniques that operate on objects.

BACKGROUND OF THE INVENTION

Administrative tasks support the day to day operation of computing devices, such as laptop, desktops, and the like. System administrators, who maintain networked computing devices, perform many administrative tasks. One administrative task involves identifying problems with computing devices that are not operating as desired. One technique for diagnosing this type of problem involves comparing the computing device with a working computing device. This comparison may include visually reviewing settings between the two devices using a graphical user interface or performing a comparison between similar files on the two devices.

Different utilities for comparison have been available for quite some time. However, each type of file uses a tool particular to that type of file and has its own syntax and peculiarities. For example, if the type of file is a text file, a textual compare tool is used. Similarly, if the type of file is a binary file, a binary compare tool is used. In general, each of these comparison utilities walks through the files until a difference is encountered. When a difference is encountered, the difference is reported to the system administrator. While these comparison utilities are helpful, they often report differences that are not related to the problem. Therefore, there is a need for a comparison technique that provides more accurate results and more versatility.

SUMMARY OF THE INVENTION

The present comparison technique operates on objects of the same type, similar types, or different types. Multiple comparison objects may be compared against one or more reference objects. The comparison objects may be obtained from a prior cmdlet in a pipeline of cmdlets operating in an object-based environment. The reference object and comparison object may be compared in an order-based manner or in a key-based manner. In addition, specific properties may be specified which will identify which properties of the reference object and the comparison object to compare during the comparison. The comparison may generate an output that identifies the difference or the similarities. The output may be pipelined to another cmdlet for further processing.

DETAILED DESCRIPTION

Briefly stated, the present comparison technique operates on objects of the same type, similar types, or different types. The comparison allows the results to be automatically used as input to another operation that may ultimately fix a problem.

The following detailed description is divided into several sections. A first section describes an illustrative computing environment on which the comparison technique may operate. A second section describes an exemplary framework for an object-based administrative tool environment on which the present comparison technique may be incorporated. This includes detailed descriptions for the individual components of the exemplary framework and the operation of these components. A third section describes the comparison technique and its operation.

Section One: Exemplary Computing Environment

Figure 1:
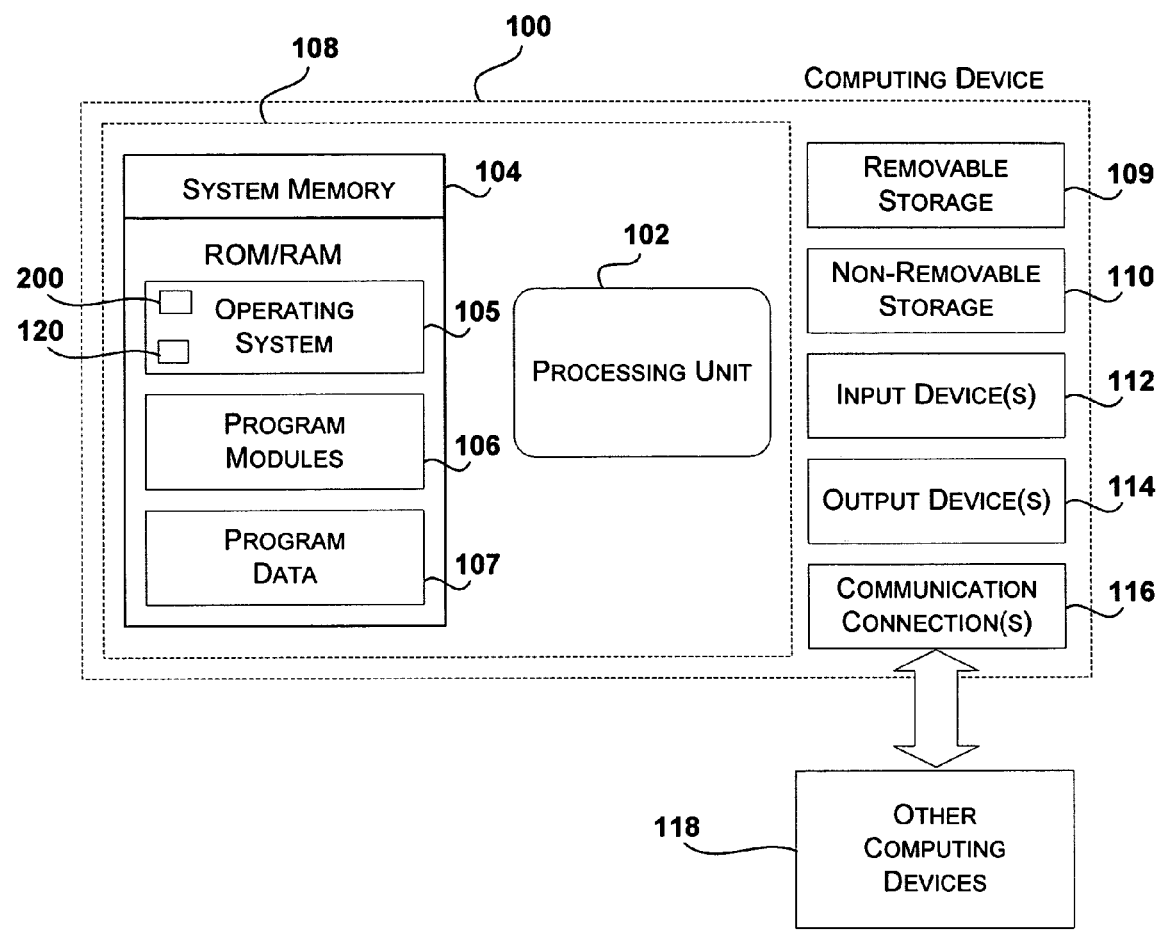
FIG. 1 illustrates an exemplary computing device in which the present comparison technique may be implemented.

FIG. 1 illustrates an exemplary computing device that may be used in implementing the present comparison technique. In a very basic configuration, computing device 100 typically includes at least one processing unit 102 and system memory 104. Depending on the exact configuration and type of computing device, system memory 104 may be volatile (such as RAM), on-volatile (such as ROM, flash memory, etc.) or some combination of the two. System memory 104 typically includes an operating system 105, one or more program modules 106, and may include one or more program data 107. The system memory 104 also includes a component-based framework 120 that supports components (including properties and events), objects, inheritance, polymorphism, reflection, and provides an object-oriented component-based application programming interface (API), such as that of the .NET™ Framework manufactured by Microsoft Corporation, Redmond, Wash. The system memory 104 also includes an administrative tool framework 200 that interacts with the component-based framework 120 to support development of administrative tools (not shown). The component-based framework 120 and the administrative tool framework 200 may reside as part of the operating system 105 (as shown) or may reside as part of the program modules 106. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Section Two: Administrative Tool Framework

Figure 2:
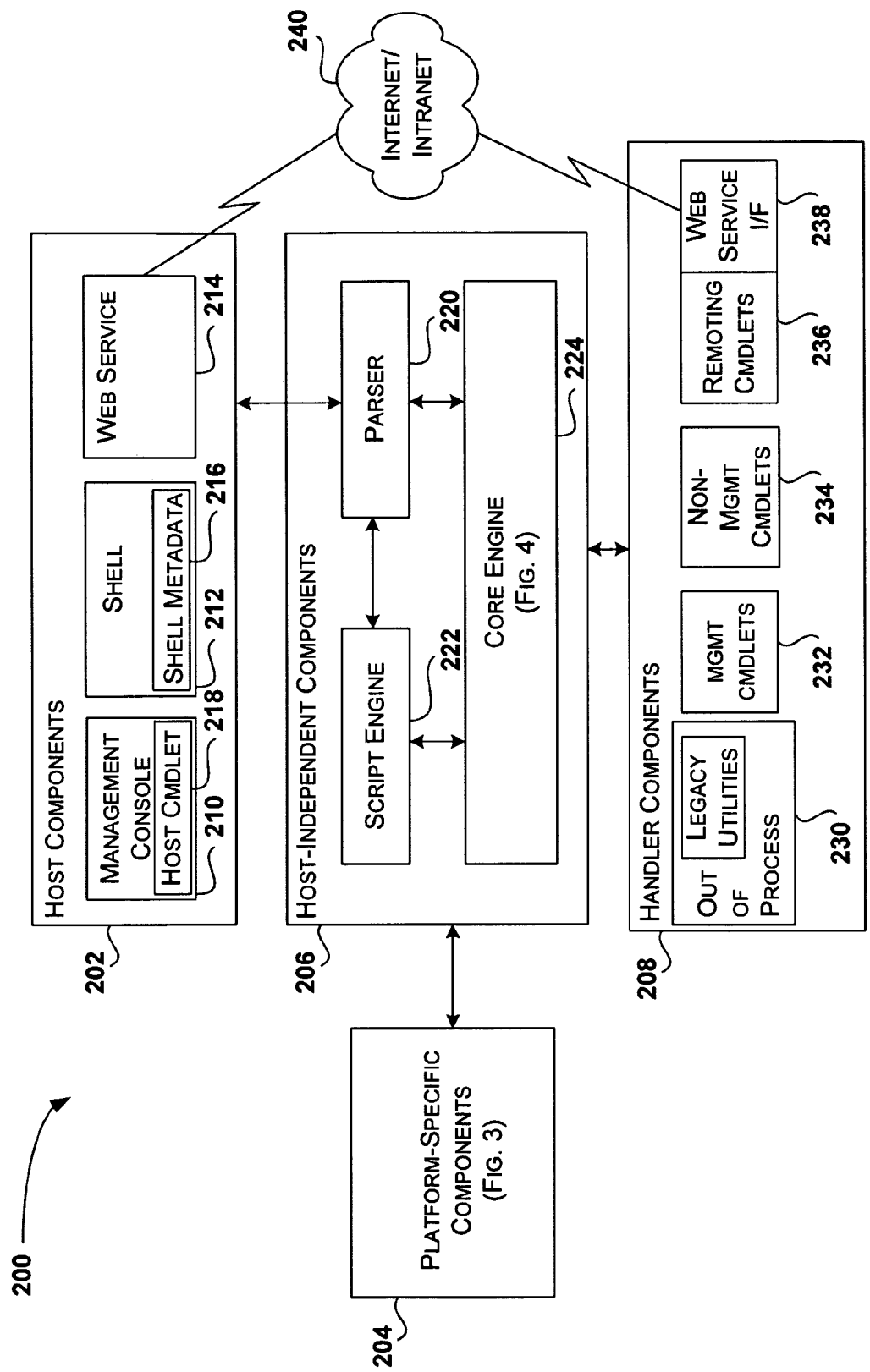
FIG. 2 is a block diagram generally illustrating an overview of an object-based administrative tool framework incorporating the present comparison technique.

FIG. 2 is a block diagram generally illustrating an overview of an exemplary administrative tool framework 200. Administrative tool framework 200 includes one or more host components 202, platform-specific components 204, host-independent components 206, and handler components 208. The host-independent components 206 may communicate with each of the other components (i.e., the host components 202, the platform-specific components 204, and the handler components 208). Each of these components are briefly described below and described in further detail, as needed, in subsequent sections.

Host Components

The host components 202 include one or more host programs (e.g., host programs 210-214) that expose automation features for an associated application to users or to other programs. The automation features may automate navigation, diagnostics, configuration, lifecycle, operations, and the like. Each host program 210-214 may expose these automation features in its own particular style, such as via a command line, a graphical user interface (GUI), a voice recognition interface, application programming interface (API), a scripting language, a web service, and the like. However, each of the host programs 210-214 expose the one or more automation features through a mechanism provided by the administrative tool framework.

In this example, the mechanism uses cmdlets to surface the administrative tool capabilities to a user of the associated host program 210-214. In addition, the mechanism uses a set of interfaces made available by the host to embed the administrative tool environment within the application associated with the corresponding host program 210-214.

Throughout the following discussion, the term "cmdlet" is used to refer to commands that are used within the exemplary administrative tool environment described with reference to FIGS. 2-13. Thus, cmdlets correspond to commands in traditional administrative environments, but are quite different than these traditional commands. For example, cmdlets are typically smaller in size than their counterpart commands because the cmdlets can utilize common functions provided by the administrative tool framework, such as parsing, data validation, error reporting, and the like. Because such common functions can be implemented once and tested once, the use of cmdlets throughout the administrative tool framework allows the incremental development and test costs associated with application-specific functions to be quite low compared to traditional environments.

In addition, in contrast to traditional environments, cmdlets do not need to be stand-alone executable programs. Rather, cmdlets may run in the same processes within the administrative tool framework. This allows cmdlets to exchange "live" objects between each other. This ability to exchange "live" objects allows the cmdlets to directly invoke methods on these objects. Thus, the term "live" object refers to objects that have methods that are directly invocable. In contrast, a "dead" object refers to an object that does not have methods that are directly invocable. The details for creating and using cmdlets are described in further detail below.

In overview, each host program 210-214 manages the interactions between the user and the other components within the administrative tool framework. These interactions may include prompts for parameters, reports of errors, and the like. Typically, each host program 210-214 may provide its own set of specific host cmdlets (e.g., host cmdlets 218). For example, if the host program is an email program, the host program may provide host cmdlets that interact with mailboxes and messages. Even though FIG. 2 illustrates host programs 210-214, one skilled in the art will appreciate that host components 202 may include other host programs associated with existing or newly created applications. These other host programs will also embed the functionality provided by the administrative tool environment within their associated application. The processing provided by a host program is described in detail below in conjunction with FIG. 7.

In the examples illustrated in FIG. 2, a host program may be a management console (i.e., host program 210) that provides a simple, consistent, administration user interface for users to create, save, and open administrative tools that manage the hardware, software, and network components of the computing device. To accomplish these functions, host program 210 provides a set of services for building management GUIs on top of the administrative tool framework. The GUI interactions may also be exposed as user-visible scripts that help teach the users the scripting capabilities provided by the administrative tool environment.

In another example, the host program may be a command line interactive shell (i.e., host program 212). The command line interactive shell may allow shell metadata 216 to be input on the command line to affect processing of the command line.

In still another example, the host program may be a web service (i.e., host program 214) that uses industry standard specifications for distributed computing and interoperability across platforms, programming languages, and applications.

In addition to these examples, third parties may add their own host components by creating "provider" interfaces and provider cmdlets that are used with their host program or other host programs. The provider interface exposes an application or infrastructure so that the application or infrastructure can be manipulated by the administrative tool framework. The provider cmdlets provide automation for navigation, diagnostics, configuration, lifecycle, operations, and the like. The provider cmdlets exhibit polymorphic cmdlet behavior on a completely heterogeneous set of data stores. The administrative tool environment operates on the provider cmdlets with the same priority as other cmdlet classes. The provider cmdlet is created using the same mechanisms as the other cmdlets. The provider cmdlets expose specific functionality of an application or an infrastructure to the administrative tool framework. Thus, through the use of cmdlets, product developers need only create one host component that will then allow their product to operate with many administrative tools. For example, with the exemplary administrative tool environment, system level graphical user interface help menus may be integrated and ported to existing applications.

Platform-specific Components

The platform-specific components 204 include a collection of services that computing systems (e.g., computing device 100 in FIG. 1) use to isolate the administrative tool framework from the specifics of the platform on which the framework is running. Thus, there is a set of platform-specific components for each type of platform. The platform-specific components allow the users to use the same administrative tools on different operating systems.

Figure 3:
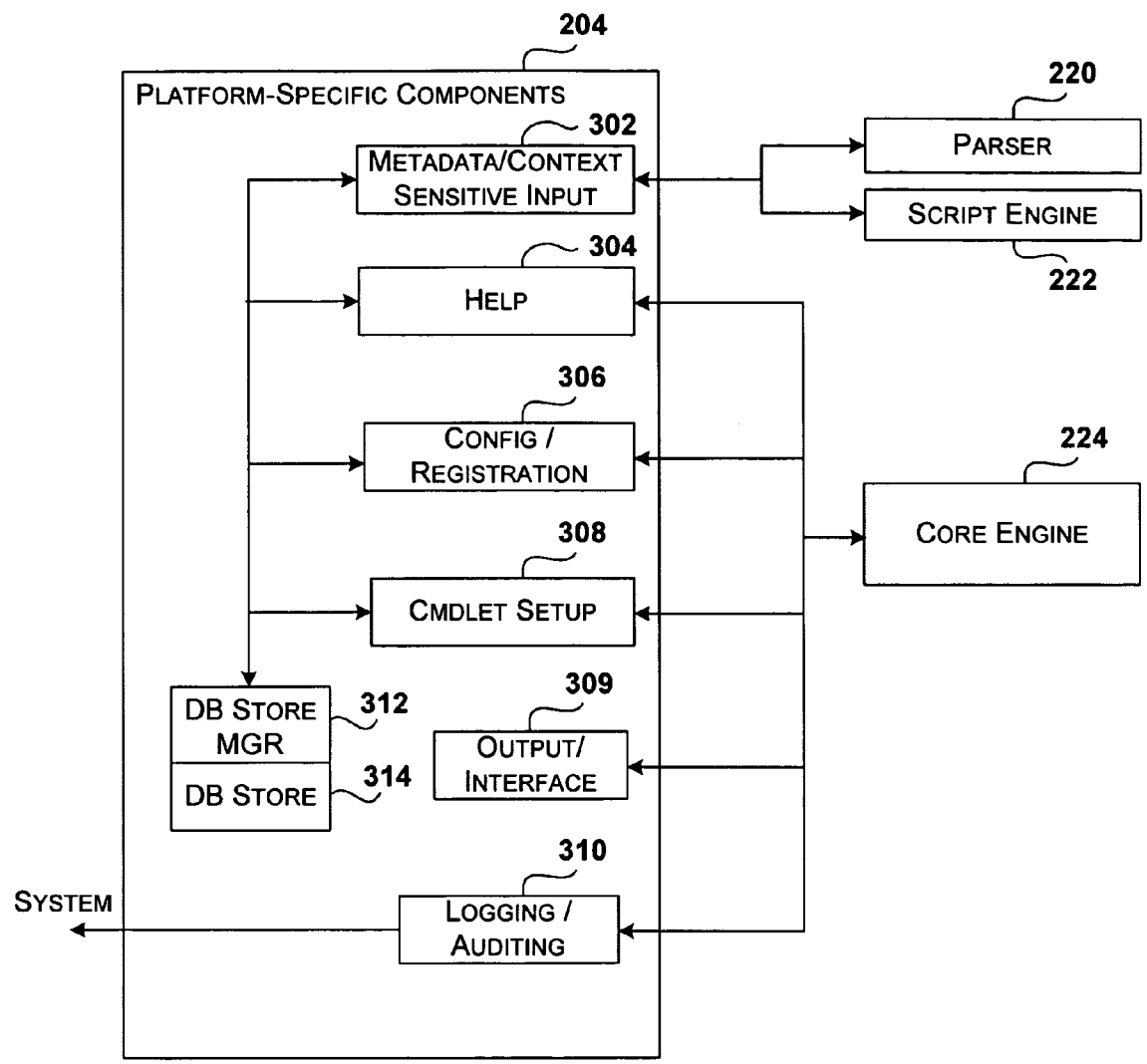
FIG. 3 is a block diagram illustrating components within the platform-specific components of the object-based administrative tool framework shown in FIG. 2.

Turning briefly to FIG. 3, the platform-specific components 204 may include a metadata/context sensitive input component 302, a help component 304, a configuration/registration component 306, a cmdlet setup component 308, and an output interface component 309 Components 302-308 communicate with a database store manager 312 associated with a database store 314. The parser 220 and script engine 222 communicate with the metadata/context sensitive input component 302. The core engine 224 communicates with the help cmdlet component 304, the configuration/registration component 306, the cmdlet setup component 308, and the output interface component 309. The output interface component 309 includes interfaces provided by the host to output cmdlets. The cmdlets that are output can then call the host's output object to perform the rendering. Platform-specific components 204 may also include a logging/auditing component 310, which the core engine 224 uses to communicate with host specific (i.e., platform specific) services that provide logging and auditing capabilities.

In one exemplary administrative tool framework, the metadata/context sensitive input component 302 provides auto-completion of commands, parameters, and parameter values. The help cmdlet component 304 provides a customized help system based on a host user interface.

Handler Components

Referring back to FIG. 2, the handler components 208 includes legacy utilities 230, management cmdlets 232, non-management cmdlets 234, remoting cmdlets 236, and a web service interface 238. Each of these are described in greater detail below. The management cmdlets 232 (also referred to as platform cmdlets) include cmdlets that query or manipulate the configuration information associated with the computing device. Because management cmdlets 232 manipulate system type information, they are dependant upon a particular platform. However, each platform typically has management cmdlets 232 that provide similar actions as management cmdlets 232 on other platforms. For example, each platform supports management cmdlets 232 that get and set system administrative attributes (e.g., get/process, set/IPAddress). The host-independent components 206 communicate with the management cmdlets via a public API.

The non-management cmdlets 234 (sometimes referred to as base cmdlets) include cmdlets that group, sort, filter, and perform other processing on objects provided by the management cmdlets 232 and any other cmdlets. In accordance with the present comparison technique, the non-management cmdlets 234 include a "compare-object" cmdlet, which will be described in detail in conjunction with FIGS. 14-23. The non-management cmdlets 234 may be the same on each platform and provide a set of utilities that interact with host-independent components 206 via a public API. The interactions between the non-management cmdlets 234 and the host-independent components 206 allow reflection on objects and allow processing on the reflected objects independent of their (object) type. Thus, these utilities allow developers to write non-management cmdlets once and then apply these non-management cmdlets across all classes of objects supported on a computing system. In the past, developers had to first comprehend the format of the data that was to be processed and then write the application to process only that data. As a consequence, traditional applications could only process data of a very limited scope. One exemplary mechanism for processing objects independent of their object type is described below in conjunction with FIG. 13.

The legacy utilities 230 include existing executables, such as win32 command line executables. Each legacy utility 230 communicates with the administrative tool framework using text streams (e.g., stdin, stdout, and stderr), which are a type of object within the object framework. Because the legacy utilities 230 utilize text streams, reflection-based operations provided by the administrative tool framework are not available. The legacy utilities 230 execute in a different process than the administrative tool framework. Although not shown, other cmdlets may also operate out of process.

The remoting cmdlets 236, in combination with the web service interface 238, provide remoting mechanisms to access interactive and programmatic administrative tool environments on other computing devices over a communication media, such as internet or intranet (e.g., internet/intranet 240 shown in FIG. 2). In one exemplary administrative tool framework, the remoting mechanisms support federated services that depend on infrastructure that spans multiple independent control domains. The remoting mechanism allows scripts to execute on remote computing devices. The scripts may be run on a single or on multiple remote systems. The results of the scripts may be processed as each individual script completes or the results may be aggregated and processed en-masse after all the scripts on the various computing devices have completed.

For example, web service 214 shown as one of the host components 202 may be a remote agent. In another embodiment, web service 214 may be a separate component (not shown) that communicates with the engine through the communication media 240. For either configuration, web service 214 then communicates with the engine which is configured to communicate with the other host components to control cmdlets. The remote agent handles the submission of remote command requests to the parser and administrative tool framework on the target system. The remoting cmdlets serve as the remote client to provide access to the remote agent. The remote agent and the remoting cmdlets communicate via a parsed stream. This parsed stream may be protected at the protocol layer, or additional cmdlets may be used to encrypt and then decrypt the parsed stream.

Host-Independent Components

The host-independent components 206 include a parser 220, a script engine 222 and a core engine 224. The host-independent components 206 provide mechanisms and services to group multiple cmdlets, coordinate the operation of the cmdlets, and coordinate the interaction of other resources, sessions, and jobs with the cmdlets.

Exemplary Parser

The parser 220 provides mechanisms for receiving input requests from various host programs and mapping the input requests to uniform cmdlet objects that are used throughout the administrative tool framework, such as within the core engine 224. In addition, the parser 220 may perform data processing based on the input received. The parser 220 provides the capability to easily expose different languages or syntax to users for the same capabilities. For example, because the parser 220 is responsible for interpreting the input requests, a change to the code within the parser 220 that affects the expected input syntax will essentially affect each user of the administrative tool framework. Therefore, system administrators may provide different parsers on different computing devices that support different syntax. However, each user operating with the same parser will experience a consistent syntax for each cmdlet. In contrast, in traditional environments, each command implemented its own syntax. Thus, with thousands of commands, each environment supported several different syntax, usually many of which were inconsistent with each other.

Exemplary Script Engine

The script engine 222 provides mechanisms and services to tie multiple cmdlets together using a script. A script is an aggregation of command lines that share session state under strict rules of inheritance. The multiple command lines within the script may be executed either synchronously or asynchronously, based on the syntax provided in the input request. The script engine 222 has the ability to process control structures, such as loops and conditional clauses and to process variables within the script. The script engine also manages session state and gives cmdlets access to session data based on a policy (not shown).

Exemplary Core Engine

Figure 4:
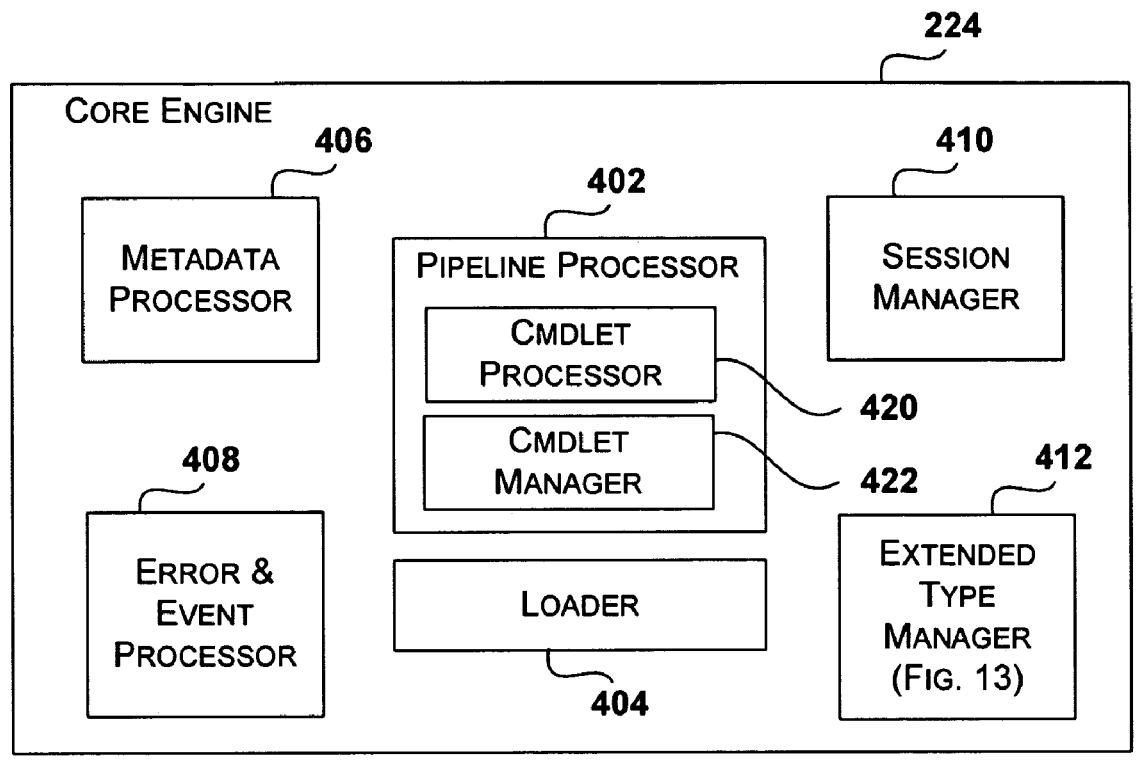
FIG. 4 is a block diagram illustrating components within the core engine component of the object-based administrative tool framework shown in FIG. 2.

The core engine 224 is responsible for processing cmdlets identified by the parser 220. Turning briefly to FIG. 4, an exemplary core engine 224 within the administrative tool framework 200 is illustrated. The exemplary core engine 224 includes a pipeline processor 402, a loader 404, a metadata processor 406, an error & event handler 408, a session manager 410, and an extended type manager 412.

Exemplary Metadata Processor

The metadata processor 406 is configured to access and store metadata within a metadata store, such as database store 314 shown in FIG. 3. The metadata may be supplied via the command line, within a cmdlet class definition, and the like. Different components within the administrative tool framework 200 may request the metadata when performing their processing. For example, parser 202 may request metadata to validate parameters supplied on the command line.

Exemplary Error & Event Processor

The error & event processor 408 provides an error object to store information about each occurrence of an error during processing of a command line.

Exemplary Session Manager

The session manager 410 supplies session and state information to other components within the administrative tool framework 200. The state information managed by the session manager may be accessed by any cmdlet, host, or core engine via programming interfaces. These programming interfaces allow for the creation, modification, and deletion of state information subject to security policy constraints.

Exemplary Pipeline Processor and Loader

The loader 404 is configured to load each cmdlet in memory in order for the pipeline processor 402 to execute the cmdlet. The pipeline processor 402 includes a cmdlet processor 420 and a cmdlet manager 422. The cmdlet processor 420 dispatches individual cmdlets. If the cmdlet requires execution on a remote, or a set of remote machines, the cmdlet processor 420 coordinates the execution with the remoting cmdlet 236 shown in FIG. 2. The cmdlet manager 422 handles the execution of aggregations of cmdlets. The cmdlet manager 422, the cmdlet processor 420, and the script engine 222 (FIG. 2) communicate with each other in order to perform the processing on the input received from the host program 210-214. The communication may be recursive in nature. For example, if the host program provides a script, the script may invoke the cmdlet manager 422 to execute a cmdlet, which itself may be a script. The script may then be executed by the script engine 222. One exemplary process flow for the core engine is described in detail below in conjunction with FIG. 14.

Exemplary Extended Type Manager

As mentioned above, the administrative tool framework provides a set of utilities that allows reflection on objects and allows processing on the reflected objects independent of their (object) type. The administrative tool framework 200 interacts with the component framework on the computing system (component framework 120 in FIG. 1) to perform this reflection. As one skilled in the art will appreciate, reflection provides the ability to query an object and to obtain a type for the object, and then reflect on various objects and properties associated with that type of object to obtain other objects and/or a desired value.

Even though reflection provides the administrative tool framework 200 a considerable amount of information on objects, reflection focuses on the type of object. For example, when a database datatable is reflected upon, the information that is returned is that the datatable has two properties: a column property and a row property. These two properties do not provide sufficient detail regarding the "objects" within the datatable. Similar problems arise when reflection is used on extensible markup language (XML) and other objects.

Thus, instead of focusing on the type of object, the extended type manager 412 focuses on the usage of the type to determine whether the object can be used to obtain required information. Continuing with the above datatable example, the fact that the datatable has a column property and a row property is not particularly interesting. Rather, what is interesting is that one column contains information of interest. Therefore, focusing on the usage, the extended type manager 412 associates each row with an "object" and associates each column with a "property" of that "object". Thus, the extended type manager 412 provides a mechanism to create "objects" from any type of precisely parse-able input. In so doing, the extended type manager 412 supplements the reflection capabilities provided by the component-based framework 120 and extends "reflection" to any type of precisely parse-able input.

In overview, the extended type manager is configured to access precisely parse-able input (not shown) and to correlate the precisely parse-able input with a requested data type. The extended type manager 412 then provides the requested information to the requesting component, such as the pipeline processor 402 or parser 220. In the following discussion, precisely parse-able input is defined as input in which properties and values may be discerned. Some exemplary precisely parse-able input include Windows Management Instrumentation (WMI) input, ActiveX Data Objects (ADO) input, eXtensible Markup Language (XML) input, and object input, such as .NET objects. Other precisely parse-able input may include third party data formats.

Figure 13:
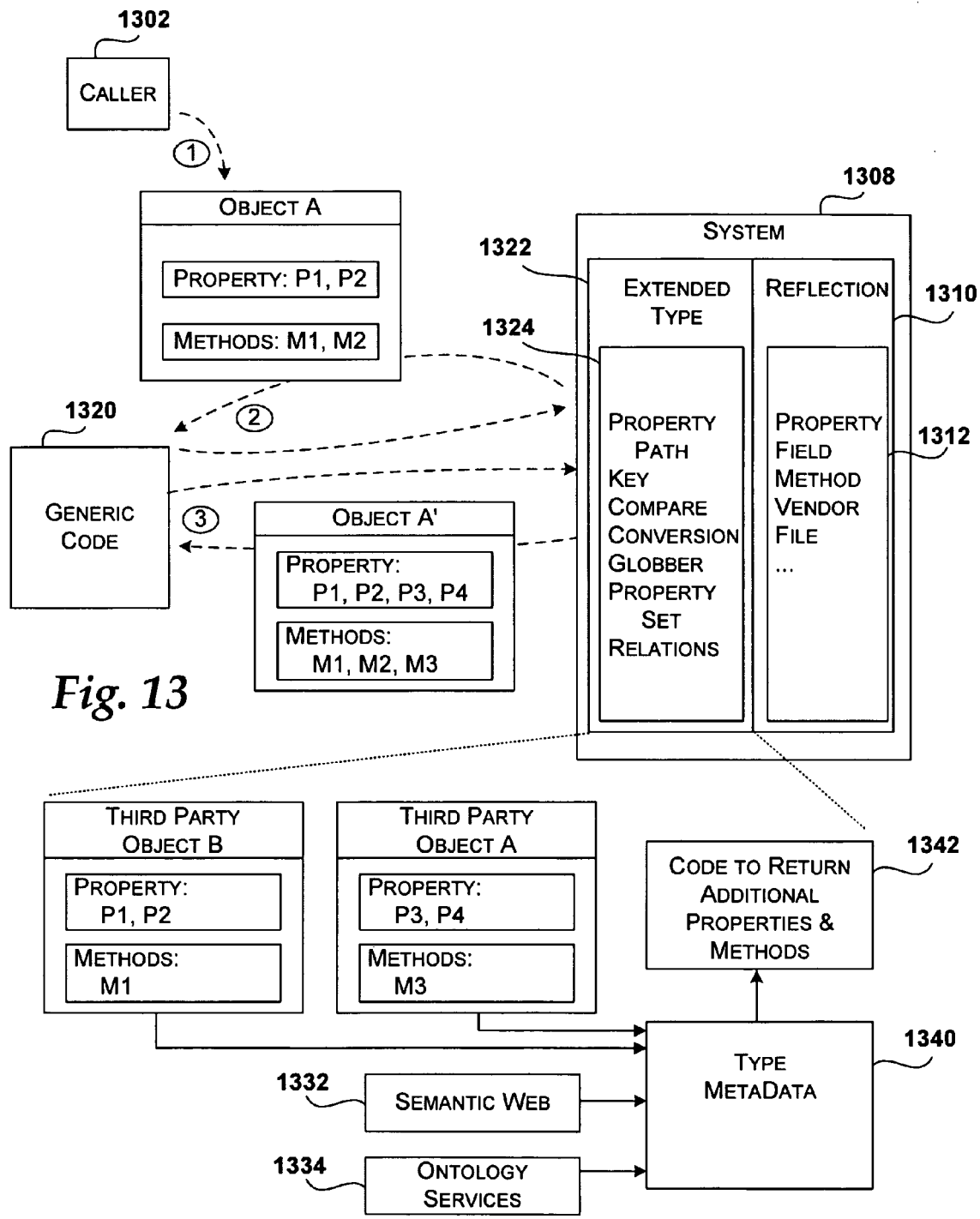
FIG. 13 is a functional block diagram of an exemplary extended type manager suitable for use within the object-based administrative tool framework shown in FIG. 2.

Turning briefly to FIG. 13, a functional block diagram of an exemplary extended type manager for use within the administrative tool framework is shown. For explanation purposes, the functionality (denoted by the number "3" within a circle) provided by the extended type manager is contrasted with the functionality provided by a traditional tightly bound system (denoted by the number "1" within a circle) and the functionality provided by a reflection system (denoted by the number "2" within a circle). In the traditional tightly bound system, a caller 1302 within an application directly accesses the information (e.g., properties A and B, methods M1 and M2) within object A. As mentioned above, the caller 1302 must know, a priori, the properties (e.g., properties A and B) and methods (e.g., methods M1 and M2) provided by object A at compile time. In the reflection system, generic code 1320 (not dependent on any data type) queries a system 1308 that performs reflection 1310 on the requested object and returns the information (e.g., properties A and B, methods M1 and M2) about the object (e.g., object A) to the generic code 1320. Although not shown in object A, the returned information may include additional information, such as vendor, file, date, and the like. Thus, through reflection, the generic code 1320 obtains at least the same information that the tightly bound system provides. The reflection system also allows the caller 1302 to query the system and get additional information without any a priori knowledge of the parameters.

In both the tightly bound systems and the reflection systems, new data types can not be easily incorporated within the operating environment. For example, in a tightly bound system, once the operating environment is delivered, the operating environment can not incorporate new data types because it would have to be rebuilt in order to support them. Likewise, in reflection systems, the metadata for each object class is fixed. Thus, incorporating new data types is not usually done.

However, with the present extended type manager new data types can be incorporated into the operating system. With the extended type manager 1322, generic code 1320 may reflect on a requested object to obtain extended data types (e.g., object A') provided by various external sources, such as a third party objects (e.g., object A' and B), a semantic web 1332, an ontology service 1334, and the like. As shown, the third party object may extend an existing object (e.g., object A') or may create an entirely new object (e.g., object B).

Each of these external sources may register their unique structure within a type metadata 1340 and may provide code 1342. When an object is queried, the extended type manager reviews the type metadata 1340 to determine whether the object has been registered. If the object is not registered within the type metadata 1340, reflection is performed. Otherwise, extended reflection is performed. The code 1342 returns the additional properties and methods associated with the type being reflected upon. For example, if the input type is XML, the code 1342 may include a description file that describes the manner in which the XML is used to create the objects from the XML document. Thus, the type metadata 1340 describes how the extended type manager 412 should query various types of precisely parse-able input (e.g., third party objects A' and B, semantic web 1332) to obtain the desired properties for creating an object for that specific input type and the code 1342 provides the instructions to obtain these desired properties. As a result, the extended type manager 412 provides a layer of indirection that allows "creflection" on all types of objects.

In addition to providing extended types, the extend type manager 412 provides additional query mechanisms, such as a property path mechanism, a key mechanism, a compare mechanism, a conversion mechanism, a globber mechanism, a property set mechanism, a relationship mechanism, and the like. Each of these query mechanisms, described below in the section "Exemplary Extended Type Manager Processing", provides flexibility to system administrators when entering command strings. Various techniques may be used to implement the semantics for the extended type manager. Three techniques are described below. However, those skilled in the art will appreciate that variations of these techniques may be used without departing from the scope of the claimed invention.

In one technique, a series of classes having static methods (e.g., getproperty( )) may be provided. An object is input into the static method (e.g., getproperty(object)), and the static method returns a set of results. In another technique, the operating environment envelopes the object with an adapter. Thus, no input is supplied. Each instance of the adapter has a getproperty method that acts upon the enveloped object and returns the properties for the enveloped object. The following is pseudo code illustrating this technique:

```
Class Adaptor
{
    Object X;
    getProperties( );
}.
```

In still another technique, an adaptor class subclasses the object. Traditionally, subclassing occurred before compilation. However, with certain operating environments, subclassing may occur dynamically. For these types of environments, the following is pseudo code illustrating this technique:

```
Class A : Adaptor
{
    getProperties( )
    {
        return data;
    }
}.
```

Thus, as illustrated in FIG. 13, the extended type manager allows developers to create a new data type, register the data type, and allow other applications and cmdlets to use the new data type. In contrast, in prior administrative environments, each data type had to be known at compile time so that a property or method associated with an object instantiated from that data type could be directly accessed. Therefore, adding new data types that were supported by the administrative environment was seldom done in the past.

Referring back to FIG. 2, in overview, the administrative tool framework 200 does not rely on the shell for coordinating the execution of commands input by users, but rather, splits the functionality into processing portions (e.g., host-independent components 206) and user interaction portions (e.g., via host cmdlets). In addition, the administrative tool environment greatly simplifies the programming of administrative tools because the code required for parsing and data validation is no longer included within each command, but is rather provided by components (e.g., parser 220) within the administrative tool framework. The exemplary processing performed within the administrative tool framework is described below.

Exemplary Operation

Figure 5:
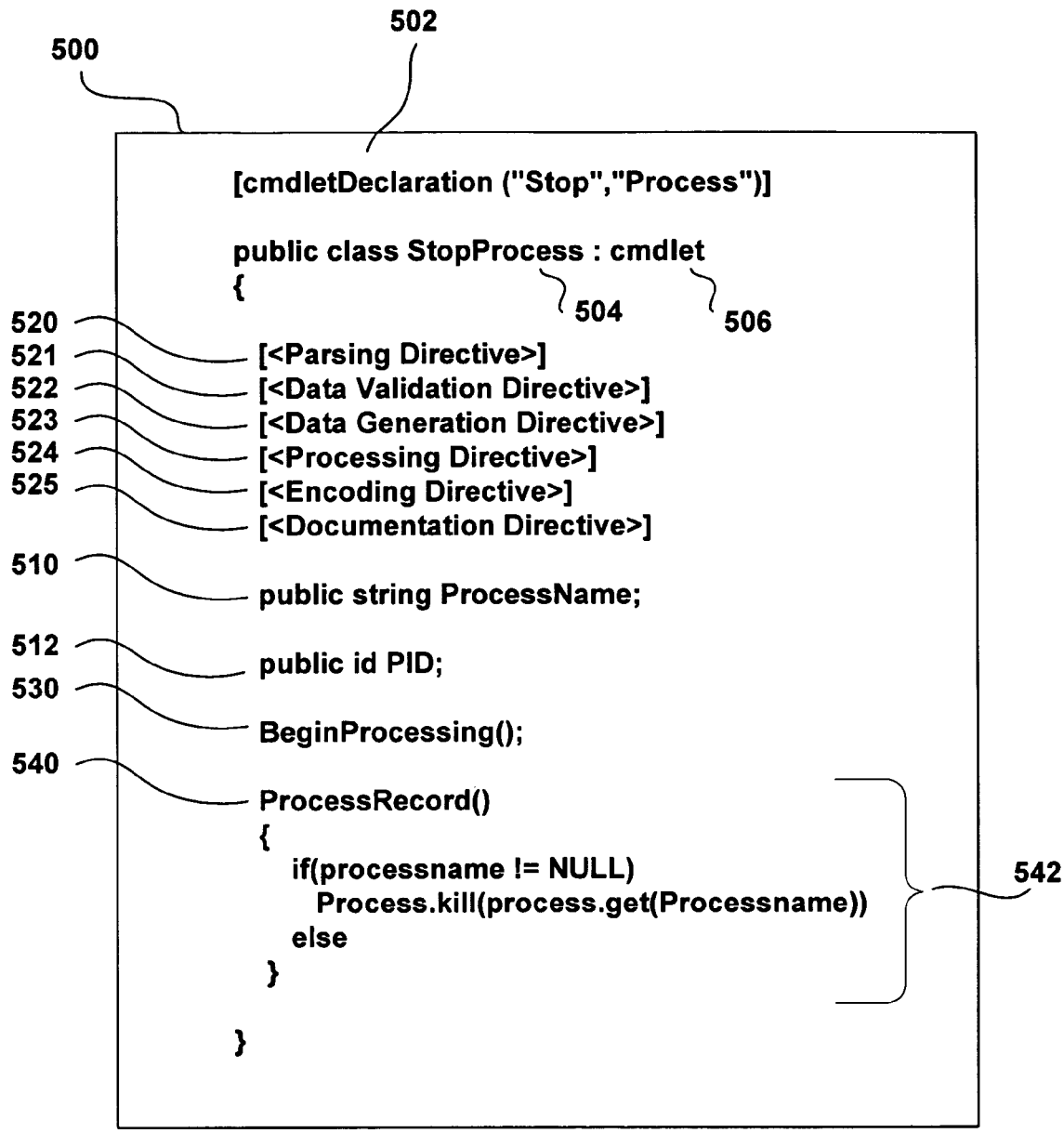
FIG. 5 is one exemplary data structure for specifying a cmdlet suitable for use within the object-based administrative tool framework shown in FIG. 2.
Figure 6:
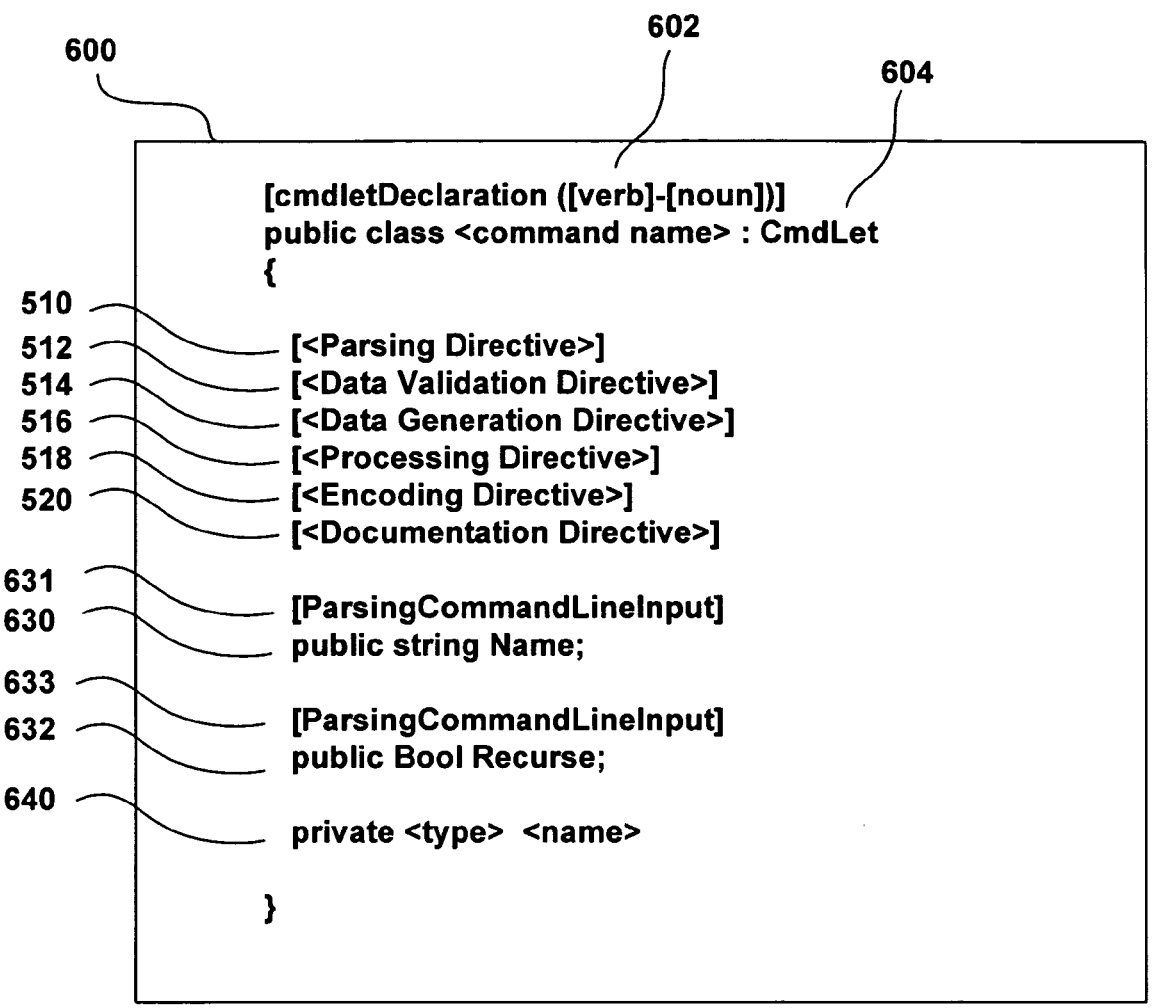
FIG. 6 is an exemplary data structure for specifying a cmdlet suitable for use within the object-based administrative tool framework shown in FIG. 2.

FIGS. 5-6 graphically illustrate exemplary data structures used within the administrative tool environment. FIGS. 7-12 graphically illustrate exemplary processing flows within the administrative tool environment. One skilled in the art will appreciate that certain processing may be performed by a different component than the component described below without departing from the scope of the present invention. Before describing the processing performed within the components of the administrative tool framework, exemplary data structures used within the administrative tool framework are described.

Exemplary Data Structures for Cmdlet Objects

FIG. 5 is an exemplary data structure for specifying a cmdlet suitable for use within the administrative tool framework shown in FIG. 2. When completed, the cmdlet may be a management cmdlet, a non-management cmdlet, a host cmdlet, a provider cmdlet, or the like. The following discussion describes the creation of a cmdlet with respect to a software developer's perspective (i.e., a provider cmdlet). However, each type of cmdlet is created in the same manner and operates in a similar manner. A cmdlet may be written in any language, such as C#. In addition, the cmdlet may be written using a scripting language or the like. When the administrative tool environment operates with the .NET Framework, the cmdlet may be a .NET object.

The provider cmdlet 500 (hereinafter, referred to as cmdlet 500) is a public class having a cmdlet class name (e.g., Stop-Process 504). Cmdlet 500 derives from a cmdlet class 506. An exemplary data structure for a cmdlet class 504 is described below in conjunction with FIG. 6. Each cmdlet 500 is associated with a command attribute 502 that associates a name (e.g., Stop/Process) with the cmdlet 500. The name is registered within the administrative tool environment. As will be described below, the parser looks in the cmdlet registry to identify the cmdlet 500 when a command string having the name (e.g., Stop/Process) is supplied as input on a command line or in a script.

The cmdlet 500 is associated with a grammar mechanism that defines a grammar for expected input parameters to the cmdlet. The grammar mechanism may be directly or indirectly associated with the cmdlet. For example, the cmdlet 500 illustrates a direct grammar association. In this cmdlet 500, one or more public parameters (e.g., ProcessName 510 and PID 512) are declared. The declaration of the public parameters drives the parsing of the input objects to the cmdlet 500. Alternatively, the description of the parameters may appear in an external source, such as an XML document. The description of the parameters in this external source would then drive the parsing of the input objects to the cmdlet.

Each public parameter 510, 512 may have one or more attributes (i.e., directives) associated with it. The directives may be from any of the following categories: parsing directive 520, data validation directive 521, data generation directive 522, processing directive 523, encoding directive 524, and documentation directive 525. The directives may be surrounded by square brackets. Each directive describes an operation to be performed on the following expected input parameter. Some of the directives may also be applied at a class level, such as user-interaction type directives. The directives are stored in the metadata associated with the cmdlet.

These attributes may also affect the population of the parameters declared within the cmdlet. One process for populating these parameters is described below in conjunction with FIG. 11. The core engine may apply these directives to ensure compliance. The cmdlet 500 includes a first method 530 (hereinafter, interchangeably referred to as BeginProcessing method 530) and a second method 540 (hereinafter, interchangeably referred to as ProcessRecord method 540). The core engine uses the first and second methods 530, 540 to direct the processing of the cmdlet 500. For example, the first method 530 is executed once and performs set-up functions. The code 542 within the second method 540 is executed for each object (e.g., record) that needs to be processed by the cmdlet 500. The cmdlet 500 may also include a third method (not shown) that cleans up after the cmdlet 500.

Thus, as shown in FIG. 5, code 542 within the second method 540 is typically quite brief and does not contain functionality required in traditional administrative tool environments, such as parsing code, data validation code, and the like. Thus, system administrators can develop complex administrative tasks without learning a complex programming language.

FIG. 6 is an exemplary data structure 600 for specifying a cmdlet. In overview, the data structure 600 provides a means for clearly expressing a contract between the administrative tool framework and the cmdlet. Data structure 600 is a public class that derives from a cmdlet class 604. The software developer specifies a cmdletDeclaration 602 that associates a noun/verb pair, such as "get/process" and "format/table", with the cmdlet 600. The noun/verb pair is registered within the administrative tool environment. The verb or the noun may be implicit in the cmdlet name. Also, similar to data structure 500, data structure 600 may include one or more public members (e.g., Name 630, Recurse 632), which may be associated with the one or more directives 520-525 described in conjunction with data structure 500.

However, in this exemplary data structure 600, each of the expected input parameters 630 and 632 is associated with an input attribute 631 and 633, respectively. The input attributes 631 and 633 specifying that the data for its respective parameter 630 and 632 should be obtained from the command line. Thus, in this exemplary data structure 600, there are not any expected input parameters that are populated from a pipelined object that has been emitted by another cmdlet. Thus, data structure 600 does not override the first method (e.g., BeginProcessing) or the second method (e.g., ProcessRecord) which are provided by the cmdlet base class.

The data structure 600 may also include another member 640 that is not recognized as an input parameter. The other member 640 may be used for storing data that is generated based on one of the directives and may be either private or public.

Thus, as illustrated in data structure 600, through the use of declaring public properties and directives within a specific cmdlet class, cmdlet developers can easily specify a grammar for the expected input parameters to their cmdlets and specify processing that should be performed on the expected input parameters without requiring the cmdlet developers to generate any of the underlying logic. Data structure 600 illustrates a direct association between the cmdlet and the grammar mechanism. As mentioned above, this associated may also be indirect, such as by specifying the expected parameter definitions within an external source, such as an XML document.

The exemplary process flows within the administrative tool environment are now described.

Exemplary Host Processing Flow

Figure 7:
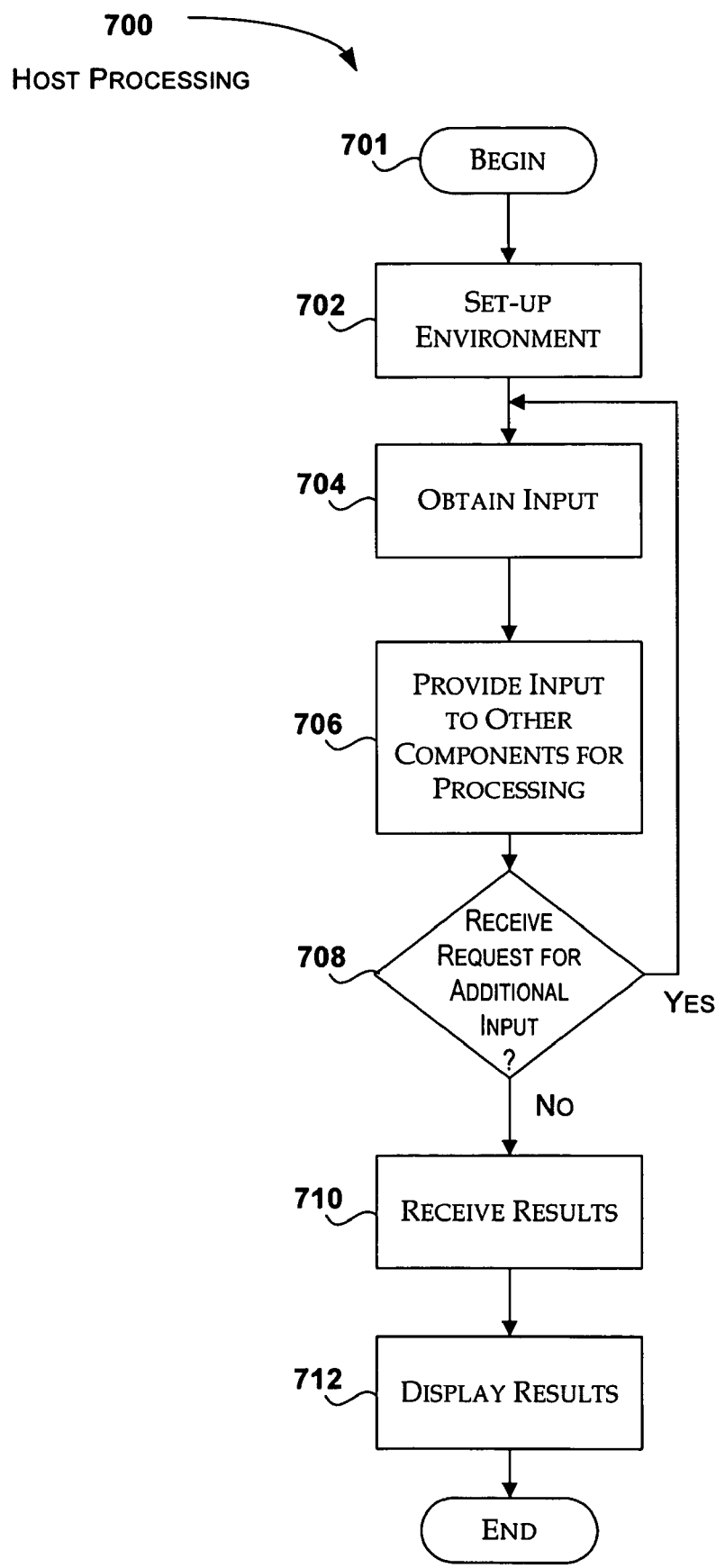
FIG. 7 is a logical flow diagram illustrating an exemplary process for host processing that is performed within the object-based administrative tool framework shown in FIG. 2.

FIG. 7 is a logical flow diagram illustrating an exemplary process for host processing that is performed within the administrative tool framework shown in FIG. 2. The process 700 begins at block 701, where a request has been received to initiate the administrative tool environment for a specific application. The request may have been sent locally through keyboard input, such as selecting an application icon, or remotely through the web services interface of a different computing device. For either scenario, processing continues to block 702.

At block 702, the specific application (e.g., host program) on the "target" computing device sets up its environment. This includes determining which subsets of cmdlets (e.g., management cmdlets 232, non-management cmdlets 234, and host cmdlets 218) are made available to the user. Typically, the host program will make all the non-management cmdlets 234 available and its own host cmdlets 218 available.

In addition, the host program will make a subset of the management cmdlets 234 available, such as cmdlets dealing with processes, disk, and the like. Thus, once the host program makes the subsets of cmdlets available, the administrative tool framework is effectively embedded within the corresponding application. Processing continues to block 704.

At block 704, input is obtained through the specific application. As mentioned above, input may take several forms, such as command lines, scripts, voice, GUI, and the like. For example, when input is obtained via a command line, the input is retrieved from the keystrokes entered on a keyboard. For a GUI host, a string is composed based on input mechanisms associated with the GUI. Processing continues at block 706.

At block 706, the input is provided to other components within the administrative tool framework for processing. The host program may forward the input directly to the other components, such as the parser. Alternatively, the host program may forward the input via one of its host cmdlets. The host cmdlet may convert its specific type of input (e.g., voice) into a type of input (e.g., text string, script) that is recognized by the administrative tool framework. For example, voice input may be converted to a script or command line string depending on the content of the voice input. Because each host program is responsible for converting their type of input to an input recognized by the administrative tool framework, the administrative tool framework can accept input from any number of various host components. In addition, the administrative tool framework provides a rich set of utilities that perform conversions between data types when the input is forwarded via one of its cmdlets. Processing performed on the input by the other components is described below in conjunction with several other figures. Host processing continues at decision block 708.

At decision block 708, a determination is made whether a request was received for additional input. This may occur if one of the other components responsible for processing the input needs additional information from the user in order to complete its processing. For example, a password may be required to access certain data, confirmation of specific actions may be needed, and the like. For certain types of host programs (e.g., voice mail), a request such as this may not be appropriate. Thus, instead of querying the user for additional information, the host program may serialize the state, suspend the state, and send a notification so that at a later time the state may be resumed and the execution of the input be continued. In another variation, the host program may provide a default value after a predetermined time period. If a request for additional input is received, processing loops back to block 704, where the additional input is obtained. Processing then continues through blocks 706 and 708 as described above. If no request for additional input is received and the input has been processed, processing continues to block 710.

At block 710, results are received from other components within the administrative tool framework. The results may include error messages, status, progress, and the like. The results are in an object form, which is recognized and processed by the host cmdlet within the administrative tool framework. As will be described below, the code written for each host cmdlet is very minimal. Thus, a rich set of output may be displayed without requiring a huge investment in development costs. Processing continues at block 712.

At block 712, the results may be viewed. The host cmdlet converts the results to the display style supported by the host program. For example, a returned object may be displayed by a GUI host program using a graphical depiction, such as an icon, barking dog, and the like. The host cmdlet provides a default format and output for the data. After the results are optionally displayed, the host processing is complete.

Exemplary Process Flows for Handling Input

Figure 8:
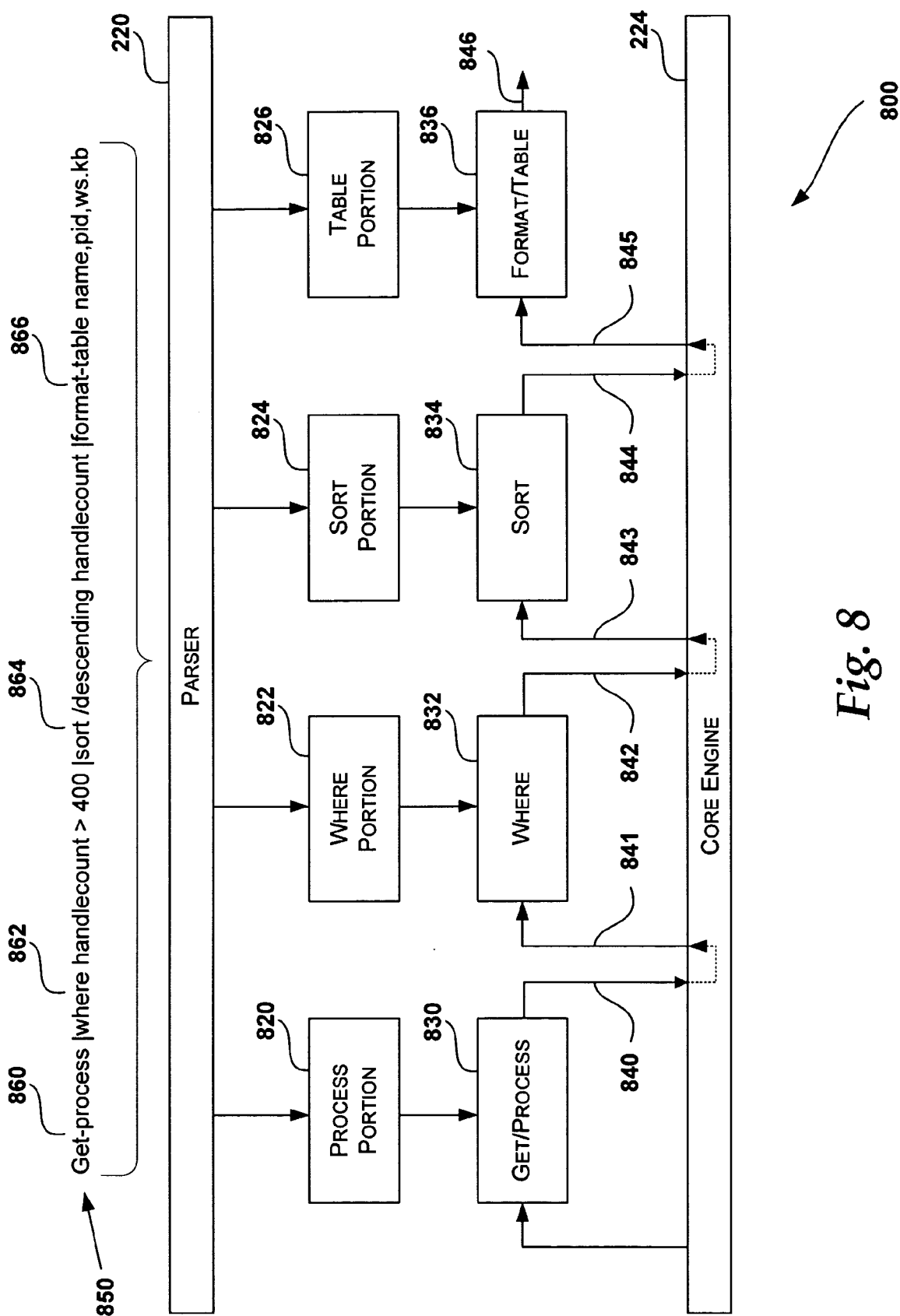
FIG. 8 is a functional flow diagram illustrating the processing of a command string in the object-based administrative tool framework shown in FIG. 2.

One exemplary process for processing command strings is now described. FIG. 8 is a functional flow diagram graphically illustrating the processing of a command string 850 through a parser 220 and a core engine 224 within the administrative tool framework shown in FIG. 2. The exemplary command string 850 pipelines several commands (i.e., process command 860, where command 862, sort command 864, and table command 866). The command line 850 may pass input parameters to any of the commands (e.g., "handlecount >400" is passed to the where command 862). One will note that the process command 860 does not have any associated input parameters.

Parser 220 parses a parsable stream (e.g., command string 850) into constituent parts 820-826 (e.g., where portion 822). Each portion 820-826 is associated with one of the cmdlets 830-836. Parser 220 and engine 224 perform various processing, such as parsing, parameter validation, data generation, parameter processing, parameter encoding, and parameter documentation. Because parser 220 and engine 224 perform common functionality on the input parameters on the command line, the administrative tool framework 200 is able to issue consistent error messages to users.

As one will recognize, the executable cmdlets 830-836 require less code than commands in prior administrative environments. Each executable cmdlet 830-836 is identified using its respective constituent part 820-826. In addition, each executable cmdlet 830-836 outputs objects (represented by arrows 840, 842, 844, and 846) which are input as input objects (represented by arrows 841, 843, and 845) to the next pipelined cmdlet. These objects may be input by passing a reference (e.g., handle) to the object. The executable cmdlets 830-836 may then perform additional processing on the objects that were passed in.

Figure 9:
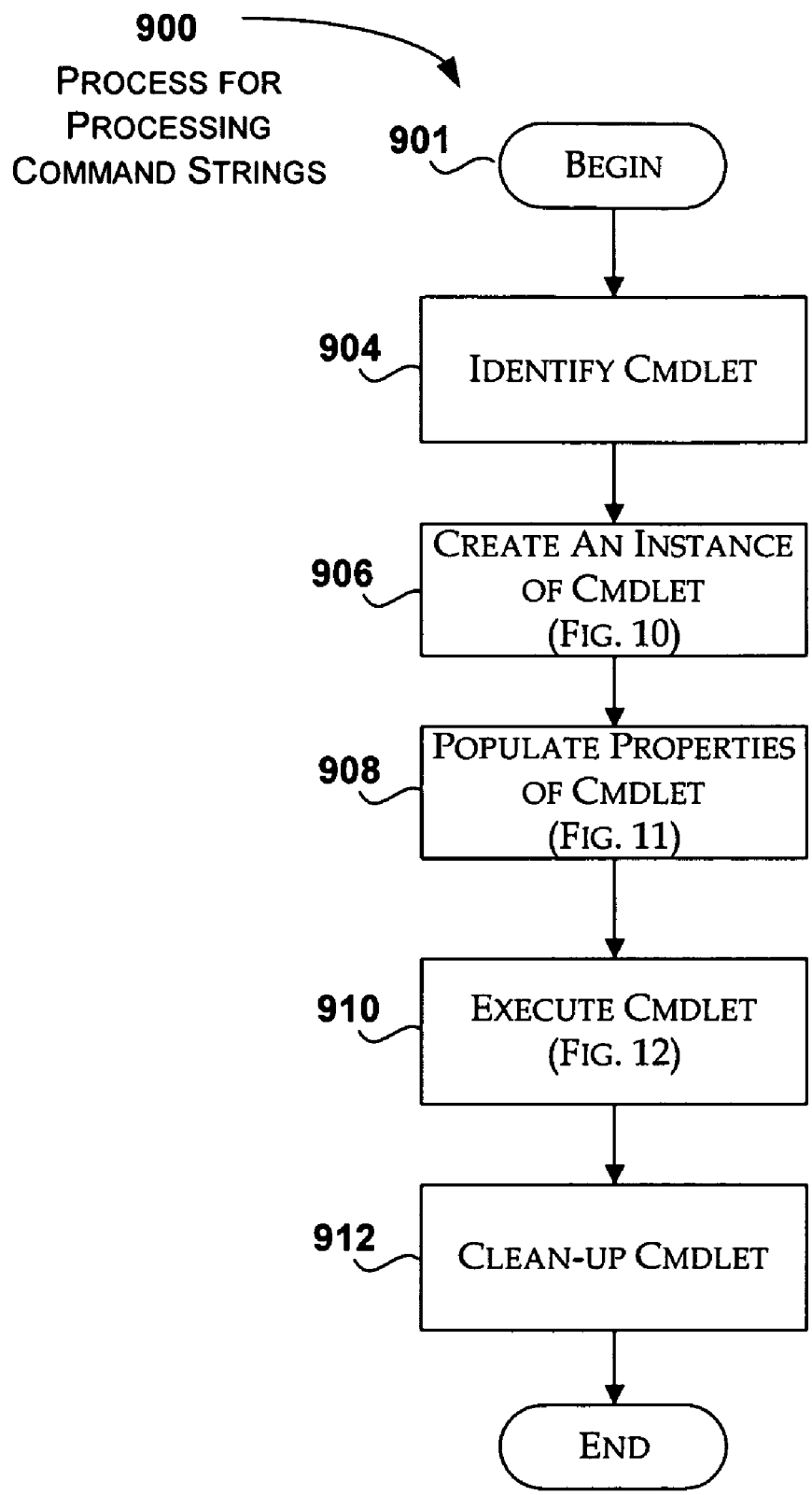
FIG. 9 is a logical flow diagram illustrating a process for processing commands strings as shown in FIG. 8.

FIG. 9 is a logical flow diagram illustrating in more detail the processing of command strings. The command string processing begins at block 901, where either the parser or the script engine identified a command string within the input. In general the core engine performs set-up and sequencing of the data flow of the cmdlets. The set-up and sequencing for one cmdlet is described below, but is applicable to each cmdlet in a pipeline. Processing continues at block 904.

At block 904, a cmdlet is identified. The identification of the cmdlet may be thru registration. The core engine determines whether the cmdlet is local or remote. The cmdlet may execute in the following locations: 1) within the application domain of the administrative tool framework; 2) within another application domain of the same process as the administrative tool framework; 3) within another process on the same computing device; or 4) within a remote computing device. The communication between cmdlets operating within the same process is through objects. The communication between cmdlets operating within different processes is through a serialized structured data format. One exemplary serialized structured data format is based on the extensible markup language (XML). Processing continues at block 906.

At block 906, an instance of the cmdlet object is created. An exemplary process for creating an instance of the cmdlet is described below in conjunction with FIG. 10. Once the cmdlet object is created, processing continues at block 908.

At block 908, the properties associated with the cmdlet object are populated. As described above, the developer declares properties within a cmdlet class or within an external source. Briefly, the administrative tool framework will decipher the incoming object(s) to the cmdlet instantiated from the cmdlet class based on the name and type that is declared for the property. If the types are different, the type may be coerced via the extended data type manager. As mentioned earlier, in pipelined command strings, the output of each cmdlet may be a list of handles to objects. The next cmdlet may inputs this list of object handles, performs processing, and passes another list of object handles to the next cmdlet. In addition, as illustrated in FIG. 6, input parameters may be specified as coming from the command line. One exemplary method for populating properties associated with a cmdlet is described below in conjunction with FIG. 11. Once the cmdlet is populated, processing continues at block 910.

At block 910, the cmdlet is executed. In overview, the processing provided by the cmdlet is performed at least once, which includes processing for each input object to the cmdlet. Thus, if the cmdlet is the first cmdlet within a pipelined command string, the processing is executed once. For subsequent cmdlets, the processing is executed for each object that is passed to the cmdlet. One method for executing cmdlets is described below in conjunction with FIG. 5. When the input parameters are only coming from the command line, execution of the cmdlet uses the default methods provided by the base cmdlet case. Once the cmdlet is finished executing, processing proceeds to block 912.

At block 912, the cmdlet is cleaned-up. This includes calling the destructor for the associated cmdlet object which is responsible for de-allocating memory and the like. The processing of the command string is then complete.

Exemplary Process for Creating a Cmdlet Object

Figure 10:
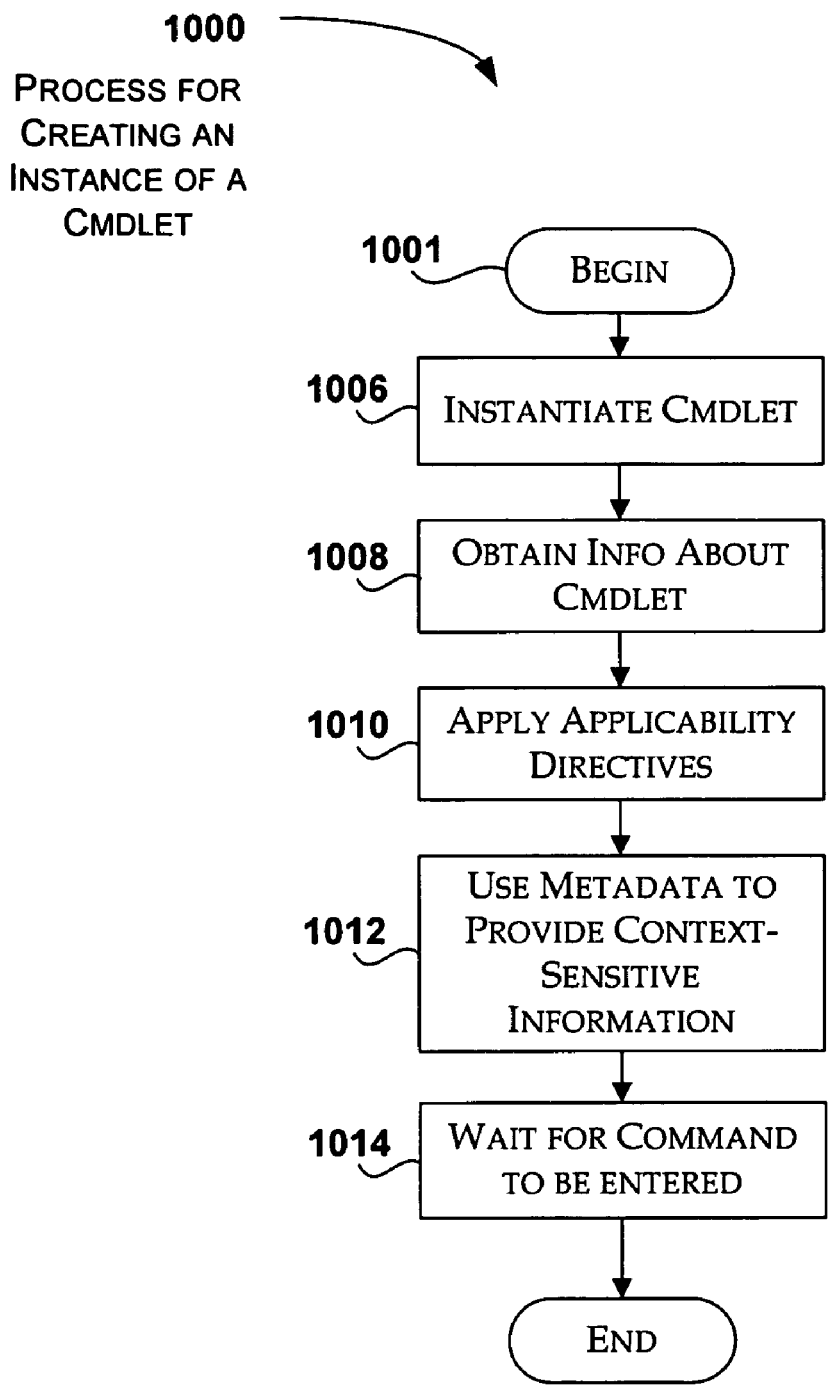
FIG. 10 is a logical flow diagram illustrating an exemplary process for creating an instance of a cmdlet suitable for use within the processing of command strings shown in FIG. 9.

FIG. 10 is a logical flow diagram illustrating an exemplary process for creating a cmdlet object suitable for use within the processing of command strings shown in FIG. 9. At this point, the cmdlet data structure has been developed and attributes and expected input parameters have been specified. The cmdlet has been compiled and has been registered. During registration, the class name (i.e., cmdlet name) is written in the registration store and the metadata associated with the cmdlet has been stored. The process 1000 begins at block 1001, where the parser has received input (e.g., keystrokes) indicating a cmdlet. The parser may recognize the input as a cmdlet by looking up the input from within the registry and associating the input with one of the registered cmdlets. Processing proceeds to block 1006.

Before proceeding to block 1006, metadata associated with the cmdlet object class may be read. The metadata includes any of the directives associated with the cmdlet. The directives may apply to the cmdlet itself or to one or more of the parameters. During cmdlet registration, the registration code registers the metadata into a persistent store. The metadata may be stored in an XML file in a serialized format, an external database, and the like. Each category of directives is processed at a different stage. Each metadata directive handles its own error handling.

At block 1006, a cmdlet object is instantiated based on the identified cmdlet class. Processing continues at block 1008.

At block 1008, information is obtained about the cmdlet. This may occur through reflection or other means. The information is about the expected input parameters. As mentioned above, the parameters that are declared public (e.g., public string Name 630) correspond to expected input parameters that can be specified in a command string on a command line or provided in an input stream. The administrative tool framework through the extended type manager, described in FIG.

13, provides a common interface for returning the information (on a need basis) to the caller. Processing continues at block 1010.

At block 1010, applicability directives are applied. The applicability directives insure that the class is used in certain machine roles and/or user roles. For example, certain cmdlets may only be used by Domain Administrators. If the constraint specified in one of the applicability directives is not met, an error occurs. Processing continues at block 1012.

At block 1012, metadata is used. At this point in processing, the entire command string has not yet been entered. The administrative tool framework, however, knows the available cmdlets. Once a cmdlet has been determined, the administrative tool framework knows the input parameters that are allowed by reflecting on the cmdlet object. Thus, the administrative tool framework may auto-complete the cmdlet once a disambiguating portion of the cmdlet name is provided, and then auto-complete the input parameter once a disambiguating portion of the input parameter has been typed on the command line. Auto-completion may occur as soon as the portion of the input parameter can identify one of the input parameters unambiguously. In addition, auto-completion may occur on cmdlet names and operands too. Processing continues at block 1014.

At block 1014, the process waits until the input parameters for the cmdlet have been entered. This may occur once the user has indicated the end of the command string, such as by hitting a return key. In a script, a new line indicates the end of the command string. This wait may include obtaining additional information from the user regarding the parameters and applying other directives. When the cmdlet is one of the pipelined parameters, processing may begin immediately. Once, the necessary command string and input parameters have been provided, processing is complete.

Exemplary Process for Populating the Cmdlet

Figure 11:
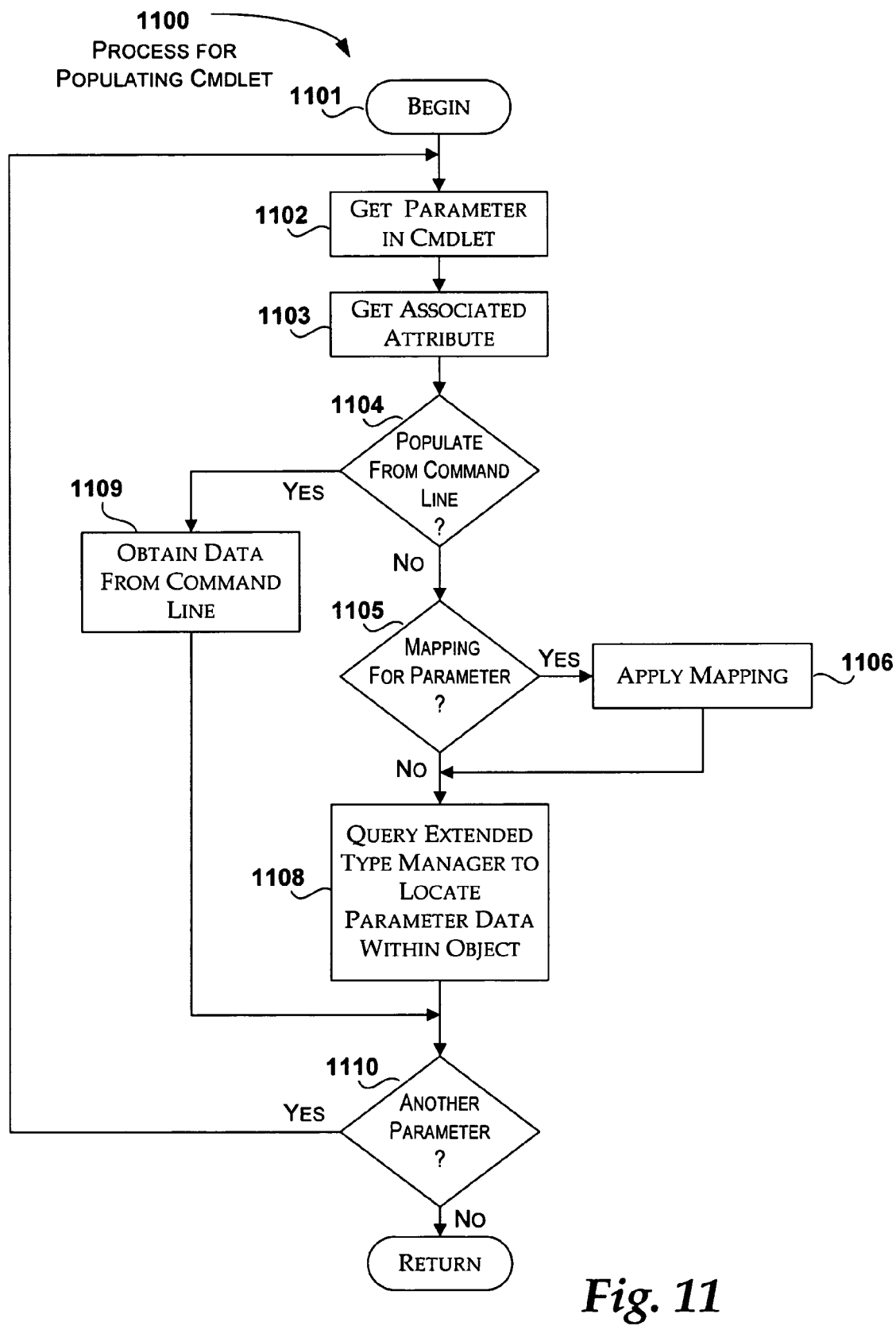
FIG. 11 is a logical flow diagram illustrating an exemplary process for populating properties of a cmdlet suitable for use within the processing of commands shown in FIG. 9.

An exemplary process for populating a cmdlet is illustrated in FIG. 11 and is now described, in conjunction with FIG. 5. In one administrative tool framework, the core engine performs the processing to populate the parameters for the cmdlet. Processing begins at block 1101 after an instance of a cmdlet has been created. Processing continues to block 1102.

At block 1102, a parameter (e.g., ProcessName) declared within the cmdlet is retrieved. Based on the declaration with the cmdlet, the core engine recognizes that the incoming input objects will provide a property named "ProcessName". If the type of the incoming property is different than the type specified in the parameter declaration, the type will be coerced via the extended type manager. The process of coercing data types is explained below in the subsection entitled "Exemplary Extended Type Manager Processing." Processing continues to block 1103.

At block 1103, an attribute associated with the parameter is obtained. The attribute identifies whether the input source for the parameter is the command line or whether it is from the pipeline. Processing continues to decision block 1104.

At decision block 1104, a determination is made whether the attribute specifies the input source as the command line. If the input source is the command line, processing continues at block 1109. Otherwise, processing continues at decision block 1105.

At decision block 1105, a determination is made whether the property name specified in the declaration should be used or whether a mapping for the property name should be used. This determination is based on whether the command input specified a mapping for the parameter. The following line illustrates an exemplary mapping of the parameter "ProcessName" to the "foo" member of the incoming object:

$get-process|where {$_.hcount-gt 500}|stop-process—ProcessName<-foo. Processing continues at block 1106.

At block 1106, the mapping is applied. The mapping replaces the name of the expected parameter from "ProcessName" to "foo", which is then used by the core engine to parse the incoming objects and to identify the correct expected parameter. Processing continues at block 1108.

At block 1108, the extended type manager is queried to locate a value for the parameter within the incoming object. As explain in conjunction with the extended type manager, the extended type manager takes the parameter name and uses reflection to identify a parameter within the incoming object with parameter name. The extended type manager may also perform other processing for the parameter, if necessary. For example, the extended type manager may coerce the type of data to the expected type of data through a conversion mechanism described above. Processing continues to decision block 1110.

Referring back to block 1109, if the attribute specifies that the input source is the command line, data from the command line is obtained. Obtaining the data from the command line may be performed via the extended type manager. Processing then continues to decision block 1110.

At decision block 1110, a determination is made whether there is another expected parameter. If there is another expected parameter, processing loops back to block 1102 and proceeds as described above. Otherwise, processing is complete and returns.

Thus, as shown, cmdlets act as a template for shredding incoming data to obtain the expected parameters. In addition, the expected parameters are obtained without knowing the type of incoming object providing the value for the expected parameter. This is quite different than traditional administrative environments. Traditional administrative environments are tightly bound and require that the type of object be known at compile time. In addition, in traditional environments, the expected parameter would have been passed into the function by value or by reference. Thus, the present parsing (e.g., "shredding") mechanism allows programmers to specify the type of parameter without requiring them to specifically know how the values for these parameters are obtained.

For example, given the following declaration for the cmdlet Foo:

```
class Foo : Cmdlet
{
    string Name;
    Bool Recurse;
}
```

The command line syntax may be any of the following:
$ Foo-Name: (string)-Recurse: True
$ Foo-Name <string>-Recurse True
$Foo-Name (string).

The set of rules may be modified by system administrators in order to yield a desired syntax. In addition, the parser may support multiple sets of rules, so that more than one syntax can be used by users. In essence, the grammar associated with the cmdlet structure (e.g., string Name and Bool Recurse) drives the parser.

In general, the parsing directives describe how the parameters entered as the command string should map to the expected parameters identified in the cmdlet object. The input parameter types are checked to determine whether correct. If the input parameter types are not correct, the input parameters may be coerced to become correct. If the input parameter types are not correct and can not be coerced, a usage error is printed. The usage error allows the user to become aware of the correct syntax that is expected. The usage error may obtain information describing the syntax from the Documentation Directives. Once the input parameter types have either been mapped or have been verified, the corresponding members in the cmdlet object instance are populated. As the members are populated, the extended type manager provides processing of the input parameter types. Briefly, the processing may include a property path mechanism, a key mechanism, a compare mechanism, a conversion mechanism, a globber mechanism, a relationship mechanism, and a property set mechanism. Each of these mechanisms is described in detail below in the section entitled "Extended Type Manager Processing", which also includes illustrative examples.

Exemplary Process for Executing the Cmdlet

Figure 12:
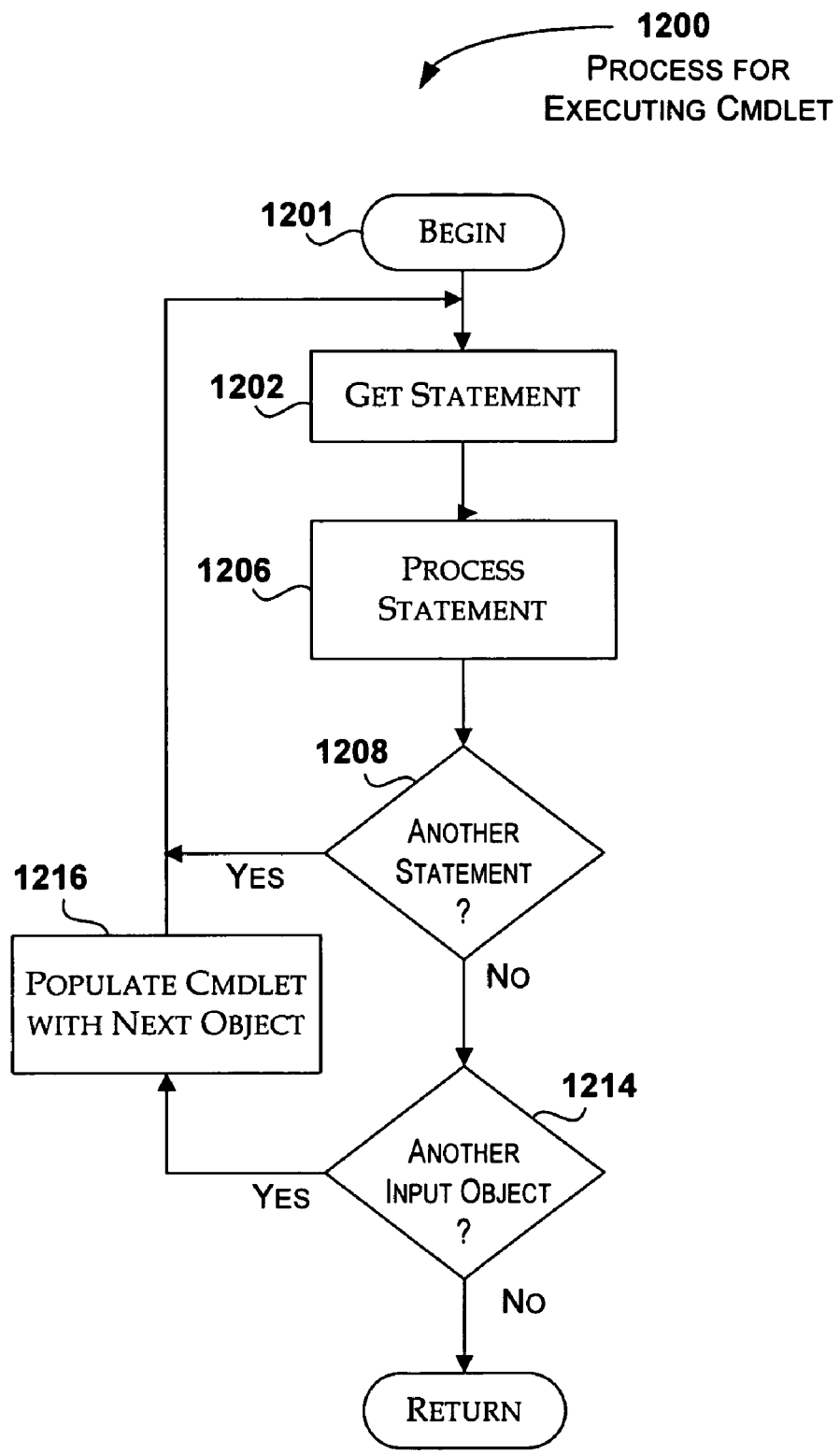
FIG. 12 is a logical flow diagram illustrating an exemplary process for executing the cmdlet suitable for use within the processing of commands shown in FIG. 9.

An exemplary process for executing a cmdlet is illustrated in FIG. 12 and is now described. In one exemplary administrative tool environment, the core engine executes the cmdlet. As mentioned above, the code 542 within the second method 540 is executed for each input object. Processing begins at block 1201 where the cmdlet has already been populated. Processing continues at block 1202.

At block 1202, a statement from the code 542 is retrieved for execution. Processing continues at block 1206.

At block 1206, the statement is processed. Processing then proceeds to decision block 1208. At block 1208, a determination is made whether the code includes another statement. If there is another statement, processing loops back to block 1202 to get the next statement and proceeds as described above. Otherwise, processing continues to decision block 1214.

At decision block 1214, a determination is made whether there is another input object to process. If there is another input object, processing continues to block 1216 where the cmdlet is populated with data from the next object. The population process described in FIG. 10 is performed with the next object. Processing then loops back to block 1202 and proceeds as described above. Once all the objects have been processed, the process for executing the cmdlet is complete and returns.

Exemplary Extended Type Manager Processing

As briefly mentioned above in conjunction with FIG. 13, the extended type manager may perform additional processing on objects that are supplied. The additional processing may be performed at the request of the parser 220, the script engine 222, or the pipeline processor 402. The additional processing includes a property path mechanism, a key mechanism, a compare mechanism, a conversion mechanism, a globber mechanism, a relationship mechanism, and a property set mechanism. Those skilled in the art will appreciate that the extended type manager may also be extended with other processing without departing from the scope of the claimed invention. Each of the additional processing mechanisms is now described.

First, the property path mechanism allows a string to navigate properties of objects. In current reflection systems, queries may query properties of an object. However, in the present extended type manager, a string may be specified that will provide a navigation path to successive properties of objects. The following is an illustrative syntax for the property path: A.B.C.D.

Each component (e.g., A, B, C, and D) comprises a string that may represent a property, a method with parameters, a method without parameters, a field, an XPATH, or the like. An XPATH specifies a query string to search for an element (e.g., "/FOO@=13"). Within the string, a special character may be included to specifically indicate the type of component. If the string does not contain the special character, the extended type manager may perform a lookup to determine the type of component. For example, if component A is an object, the extended type manager may query whether B is a property of the object, a method on the object, a field of the object, or a property set. Once the extended type manager identifies the type for B, processing according to that type is performed. If the component is not one of the above types, the extended type manager may further query the extended sources to determine whether there is a conversion function to convert the type of A into the type of B. These and other lookups will now be described using illustrative command strings and showing the respective output.

The following is an illustrative string that includes a property path:

$ get-process|where{$_.handlecount-gt 500}|format-table name.toupper, ws.kb, exe*.ver*.description.tolower.trunc (30).

In the above illustrative string, there are three property paths: (1) "name.toupper"; (2) "ws.kb"; and (3) "exe*.ver*.description.tolower.trunc(30). Before describing these property paths, one should note that "name", "ws", and "exe" specify the properties for the table. In addition, one should note that each of these properties is a direct property of the incoming object, originally generated by "get/process" and then pipelined through the various cmdlets. Processing involved for each of the three property paths will now be described.

In the first property path (i.e., "name.toupper"), name is a direct property of the incoming object and is also an object itself. The extended type manager queries the system using the priority lookup described above to determine the type for toupper. The extended type manager discovers that toupper is not a property. However, toupper may be a method inherited by a string type to convert lower case letters to upper case letters within the string. Alternatively, the extended type manager may have queried the extended metadata to determine whether there is any third party code that can convert a name object to upper case. Upon finding the component type, processing is performed in accordance with that component type.

In the second property path (i.e., "ws.kb"), "ws" is a direct property of the incoming object and is also an object itself. The extended type manager determines that "ws" is an integer. Then, the extended type manager queries whether kb is a property of an integer, whether kb is a method of an integer, and finally queries whether any code knows how to take an integer and convert the integer to a kb type. Third party code is registered to perform this conversion and the conversion is performed.

In the third property path (i.e., "exe*.ver*.description.tolower.trunc(30)"), there are several components. The first component ("exe*") is a direct property of the incoming object and is also an object. Again, the extended type manager proceeds down the lookup query in order to process the second component ("ver*"). The "exe*" object does not have a "ver*" property or method, so the extend type manager queries the extended metadata to determine whether there is any code that is registered to convert an executable name into a version. For this example, such code exists. The code may take the executable name string and use it to open a file, then accesses the version block object, and return the description property (the third component ("description") of the version block object. The extended type manager then performs this same lookup mechanism for the fourth component ("tolower") and the fifth component ("trunc(40)"). Thus, as illustrated, the extended type manager may perform quite elaborate processing on a command string without the administrator needing to write any specific code. Table 1 illustrates output generated for the illustrative string.

TABLE 1

| Name.toupper | ws.kb | exe*.ver*.description.tolower.trunc(30) |
|---|---|---|
| ETCLIENT | 29,964 | etclient |
| CSRSS | 6,944 | |
| SVCHOST | 28,944 | generic host process for win32 |
| OUTLOOK | 18,556 | office outlook |
| MSMSGS | 13,248 | messenger |

Another query mechanism 1324 includes a key. The key identifies one or more properties that make an instance of the data type unique. For example, in a database, one column may be identified as the key which can uniquely identify each row (e.g., social security number). The key is stored within the type metadata 1340 associated with the data type. This key may then be used by the extended type manager when processing objects of that data type. The data type may be an extended data type or an existing data type.

Another query mechanism 1324 includes a compare mechanism. Briefly, described in detail below in conjunction with FIGS. 14-23, the compare mechanism compares two objects. If the two objects directly support the compare function, the directly supported compare function is executed. However, if neither object supports a compare function, the extended type manager may look in the type metadata for code that has been registered to support the compare between the two objects. An illustrative series of command line strings invoking the compare mechanism is shown below, along with corresponding output in Table 2.

$ $a=$(get-date)

$ start-sleep 5

$ $b=$(get-date)

$ compare-time $a $b

TABLE 2

| Ticks: | 51196579 |
|---|---|
| Days: | 0 |
| Hours: | 0 |
| Milliseconds: | 119 |
| Minutes: | 0 |
| Seconds: | 5 |
| TotalDays: | 5.92552997685185E-05 |
| TotalHours: | 0.00142212719444444 |
| TotalMilliseconds: | 5119.6579 |
| TotalMinutes: | 0.0853276316666667 |
| TotalSeconds: | 5.1196579 |

Compare-time cmdlet is written to compare two datetime objects. In this case, the DateTime object supports the IComparable interface.

Another query mechanism 1324 includes a conversion mechanism. The extended type manager allows code to be registered stating its ability to perform a specific conversion. Then, when an object of type A is input and a cmdlet specifies an object of type B, the extended type manager may perform the conversion using one of the registered conversions. The extended type manager may perform a series of conversions in order to coerce type A into type B. The property path described above ("ws.kb") illustrates a conversion mechanism.

Another query mechanism 1324 includes a globber mechanism. A globber refers to a wild card character within a string. The globber mechanism inputs the string with the wild card character and produces a set of objects. The extended type manager allows code to be registered that specifies wildcard processing. The property path described above ("exe*.ver*.description.tolower.trunc(30)) illustrates the globber mechanism. A registered process may provide globbing for file names, file objects, incoming properties, and the like.

Another query mechanism 1324 includes a property set mechanism. The property set mechanism allows a name to be defined for a set of properties. An administrator may then specify the name within the command string to obtain the set of properties. The property set may be defined in various ways. In one way, a predefined parameter, such as "?", may be entered as an input parameter for a cmdlet. The operating environment upon recognizing the predefined parameter lists all the properties of the incoming object. The list may be a GUI that allows an administrator to easily check (e.g., "click on") the properties desired and name the property set. The property set information is then stored in the extended metadata. An illustrative string invoking the property set mechanism is shown below, along with corresponding output in Table 3:

$ get-process|where{$_.handlecount-gt 500}|format-table config.

In this illustrative string, a property set named "config" has been defined to include a name property, a process id property (Pid), and a priority property. The output for the table is shown below.

TABLE 3

| Name | Pid | Priority |
|---|---|---|
| ETClient | 3528 | Normal |
| csrss | 528 | Normal |
| svchost | 848 | Normal |
| OUTLOOK | 2,772 | Normal |
| msmsgs | 2,584 | Normal |

Another query mechanism 1324 includes a relationship mechanism. In contrast to traditional type systems that support one relationship (i.e., inheritance), the relationship mechanism supports expressing more than one relationship between types. Again, these relationships are registered. The relationship may include finding items that the object consumes or finding the items that consume the object. The extended type manager may access ontologies that describe various relationships. Using the extended metadata and the code, a specification for accessing any ontology service, such as OWL, DAWL, and the like, may be described. The following is a portion of an illustrative string which utilizes the relationship mechanism: .OWL:"string".

The "OWL" identifier identifies the ontology service and the "string" specifies the specific string within the ontology service. Thus, the extended type manager may access types supplied by ontology services.

Section Three: Exemplary Comparison Technique

FIGS. 14-23 illustrate exemplary embodiments of the present comparison technique that are operational within the object-based administrative tool framework discussed in Section Two above. The present comparison technique provides several advantages over current comparison techniques. For example, the present comparison technique allows objects of different data types to be compared with each other. In addition, results from the comparison technique may be automatically used as input to another operation that may ultimately fix the problem. These and other advantages will become apparent after reading the following detailed description.

Figure 14:
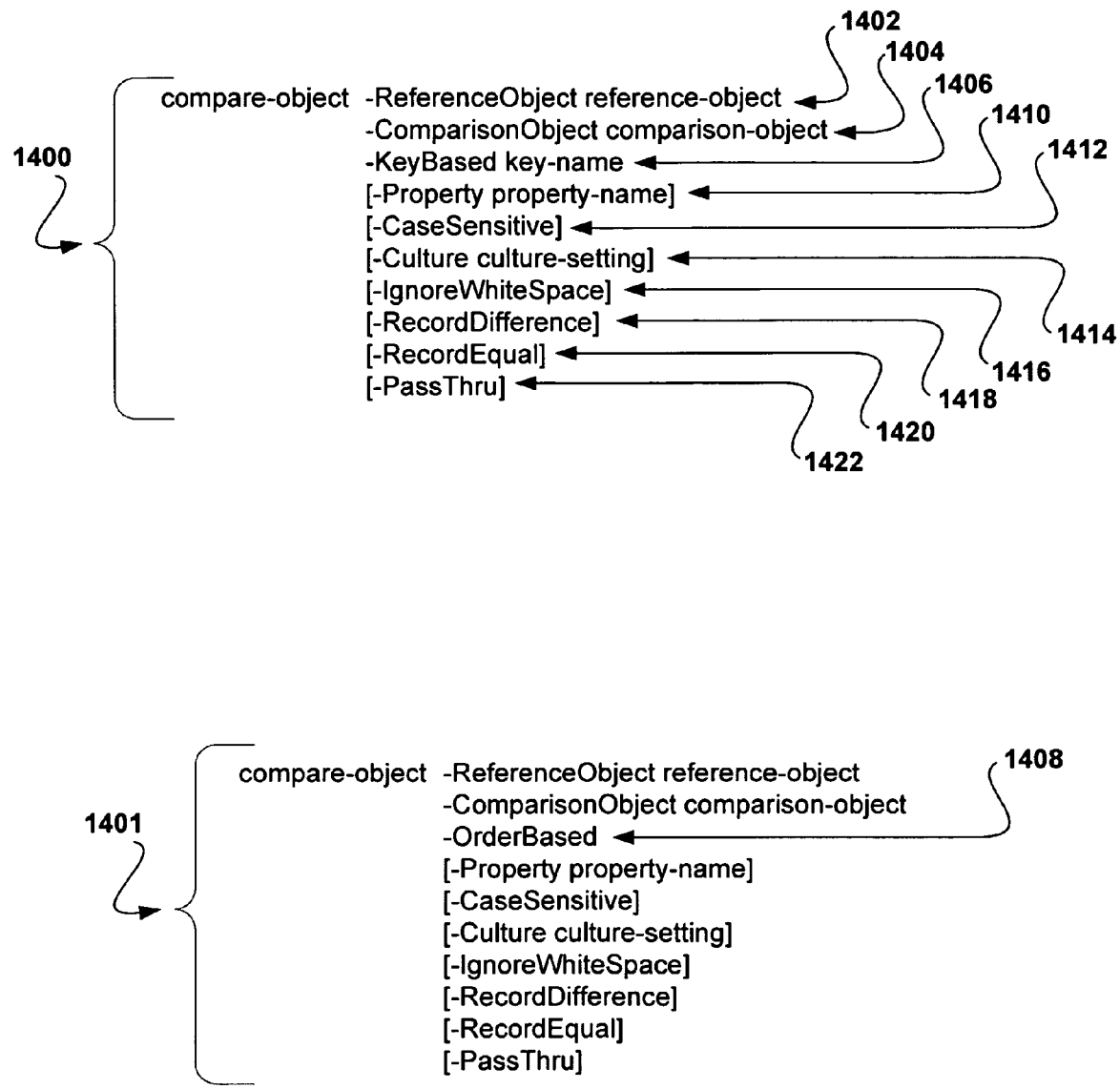
FIG. 14 illustrates an exemplary syntax for a compare cmdlet implemented within the object-based administrative framework shown in FIG. 2.

FIG. 14 illustrates embodiments of an exemplary syntax for a compare cmdlet implemented within the object-based administrative framework shown in FIG. 2. A first syntax 1400 corresponds to a key-based comparison illustrated in the flow diagram shown in FIG. 16 and described in conjunction therewith. A second syntax 1401 corresponds to an order-based comparison illustrated in the flow diagram shown in FIG. 17 and described in conjunction therewith. In order to differentiate between the two comparison techniques, either a KeyBased parameter 1406 or an OrderBased parameter 1408 is included in the command string when the compare-object cmdlet is invoked. The KeyBased parameter 1406 includes a switch (e.g., "—KeyBased") and key-name. The key-name identifies which objects are compared. Then, only objects that have a property associated with the key-name are included in the comparison. The key-name may be a single property or a set of properties.

Both the first syntax 1400 and the second syntax 1401 include other parameters. In general, most of the parameters include a switch and data. The switch represents pre-determined text that appears within the command string when invoking the compare-object cmdlet. The data is dependent on the switch. For example, some switches may be associated with Boolean data. Other switches may be associated with a property. Some of the switches may not be included in the command string with their associated data. When this occurs, the data entered in the command string may become order dependent or at least dependent on any attributes specified for the input parameters in the definition of the compare cmdlet. Each of these other parameters are now described individually.

A ReferenceObject parameter 1402 includes a "—ReferenceObject" switch and a reference object. The reference object identifies one or more objects which will have other objects compared against.

A ComparisonObject parameter 1404 includes a "—ComparisonObject" switch and a comparison object. The comparison object identifies one or more objects which are compared against the reference object. As will be shown, the comparison object may be supplied from the object-based pipeline.

Thus, the reference object may be used as a standard and compared to any number of comparison objects. For example, the reference object may be a standard configuration for a computing device and each comparison object may correspond to a different computing device that a system administrator may wish to have configured similar to the standard configuration.

A Property parameter 1410 includes a "—Property" switch and a property name. The property name may list one or more properties or may list a set of properties. The Property parameter 1410 allows specific properties to be compared, instead of comparing all properties in the objects. This ability to specify specific properties minimizes the number of unimportant differences that get reported. For example, if Process A is currently not operating (hereinafter referred to as Today Process A), but it was working yesterday (hereinafter referred to as Yesterday Process A), the Property parameter 1410 allows properties that are known to be different between the Today Process A and Yesterday Process A (e.g., CPU time, working set) from being included within the comparison. Thus, the output of the present comparison technique provides more informative information to help determine the reason for failure.

A CaseSensitive parameter 1412 includes a "—CaseSensitive" switch and an optional Boolean value for indicating "False" or "True". When the "-CaseSensitive" switch is included with the "False" value, the case of the strings within the reference object and the comparison object are not considered. Conversely, when the "True" value is specified, the case of the strings is considered in determining differences. The CaseSensitive parameter 1412 may be utilized when the reference object and the comparison object are string types. For other data types, the CaseSenstive parameter 1412 may be ignored.

A Culture parameter 1414 includes a "-Culture" switch and a culture-setting value. The culture-setting value that is specified overrides the current culture setting. The reference object and the comparison object are both treated as having the same culture. The Culture parameter 1414 may be utilized when the reference object and the comparison object are string types and ensures that the comparison of text is performed using the same language. For other data types, the Culture parameter 1414 may be ignored.

An IgnoreWhiteSpace parameter 1416 includes an "-IgnoreWhiteSpace" switch and an optional Boolean value. When the Boolean value is "false", white space is considered as part of the text during the comparison. Conversely, if the Boolean value is "true", white space within the text is ignored during the comparison. The IgnoreWhiteSpace parameter 1416 may be utilized when the reference object and the comparison object are string types. For other data types, the IgnoreWhiteSpace parameter 1416 may be ignored.

A RecordDifference parameter 1418 includes a "-RecordDifference" switch and an optional Boolean value. When the Boolean value is "false", differences between the reference object and the comparison object are not sent to the output. Conversely, when the Boolean value is "true", differences are sent to the output.

A RecordEqual parameter 1420 includes a "-RecordEqual" switch and an optional Boolean value. When the Boolean value is "false", properties of the reference object and the comparison object that have the same value are not sent to the output. When the Boolean value is "true", properties of the reference object and the comparison object that have the same value are sent to the output.

A PassThru parameter 1422 includes a "-PassThru" switch and an optional Boolean value. When the Boolean value is "false", the comparison outputs the key-names, the property values, equal indicator, and sideIndicators. SideIndicators graphically indicate whether the output is associated with the reference object or whether the output is associated with the comparison object. For example, a left sideIndicator "<=" indicates that the information that follows is from the reference object. A right sideIndicator "=>" indicates that the information that follows is from the comparison object. The equal indicator "==" indicates the comparison object and the reference object have the same values. When the Boolean value is "true", both the reference object and the comparison object are annotated and output. One will note that various characters and or graphics may be used for the sideIndicators without departing from the scope of the present comparison technique.

Figure 15:
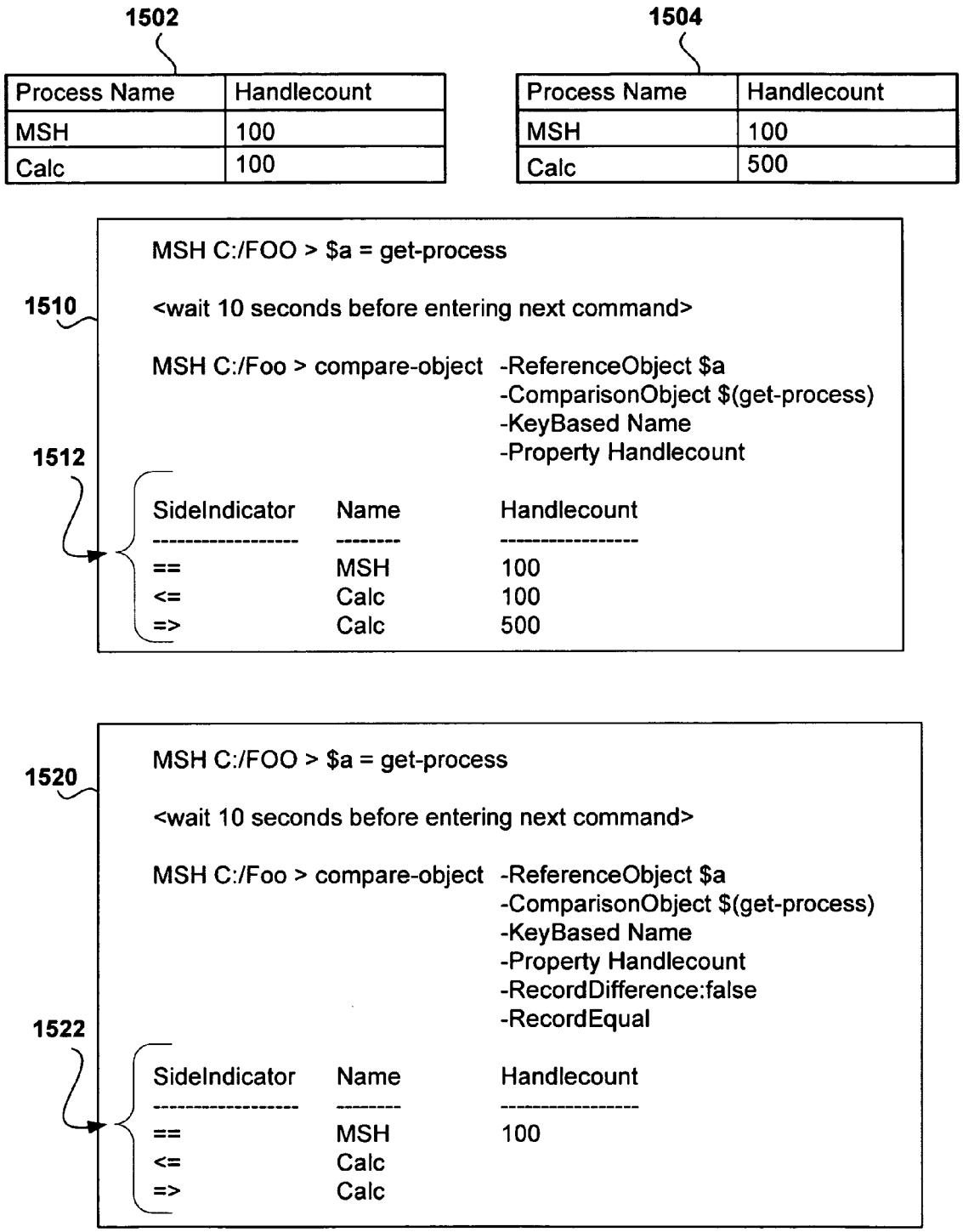
FIG. 15 illustrates examples of the invocation of the compare cmdlet along with the generated results.

FIG. 15 provides some examples that illustrate command strings invoking the compare cmdlet and that illustrate the generated output. Both of the examples 1510 and 1520 are based on example information shown in Table 1502 and Table 1504. Both Tables 1502 and 1504 have two rows and two columns: Process Name and Handlecount. The first row corresponds to the process having "MSH" for the Process Name and the second row corresponds to the process having "Calc" for the Process Name. In Table 1502, the handlecount for MSH is 100 and the handlecount for Calc is 100. In Table 1504, the handlecount for MSH is still 100, but the handlecount for Calc is 500. By way of illustration, the information in Table 1504 is assumed to have been generated ten seconds after the information in Table 1502.

In the first example 1510, the command "$a=get-process" is entered on the command line. As explained above, when the object-based administrative framework encounters this command, the information (e.g., Table 1502) generated from the get-process cmdlet is assigned to an object a. After ten seconds, the following command is entered:

| compare-object | ReferenceObject $a |
| --- | --- |
| | ComparisonObject $(get-process) |
| | KeyBased Name |
| | Property Handlecount. |

When the object-based administrative framework encounters the above command, the reference object is the object "a" that is associated with the information in Table 1502. The comparison object is the object generated from the get-process cmdlet which generated the information in Table 1504. The KeyBased parameter 1406 is included in the command string and signals to perform a KeyBased comparison on objects having a property named "ProcessName". The command string also includes the Property parameter 1410 that identifies "Handlecount" as the property to compare. Thus, for each comparison object having a ProcessName property, the handlecount property is compared with the handlecount property in the reference object. The output 1512 then indicates that the MSH process name has identical information in the reference object. The output 1512 also indicates that the Calc process name has different information in the reference object and the comparison object.

In example 1520, the first command is the same as in example 1510, but the second command is as follows:

| compare-object | ReferenceObject $a |
| --- | --- |
| | ComparisonObject $(get-process) |
| | KeyBased Name |
| | Property Handlecount |
| | RecordDifference:false |
| | RecordEqual. |

Thus, example 1520 includes the RecordDifference switch and the RecordEqual switch. The RecordDifference switch may be set with false and the RecordEqual switch may be set with true. As explained above, with these switches, output 1522 does not list the handlecount for the Calc process associated with either the reference object or the comparison object because the RecordEqual parameter specifies to output only the properties that are equal.

While examples 1510 and 1520 illustrate the operation of the compare-object cmdlet, one skilled in the art will appreciate that any number of command strings can be formulated using the various switches and other cmdlets to obtain useful information. In addition, as described above in section two, results of one cmdlet can be pipelined to other cmdlets. Thus, because the compare-object cmdlet creates a difference record which identifies each object and its difference, this difference record may be further manipulated by other cmdlets. These other cmdlets may provide processing, such as filtering, reporting, filling a database, or a control loop that resolves the differences listed in the difference record. The ability to pipeline the difference record to a control loop greatly enhances the usefulness of the present comparison technique.

In addition, the comparison technique may generate one or more output objects that encapsulate the original reference object and the original comparison object in such a way that the full semantics of these objects are available in the output object. In this embodiment, the information that is written to the difference record may be added as annotations to the original reference object. The extended type manager may perform this annotation. The output object may be configured to include each of the reference objects and the comparison object, the objects that have differences, the objects that match, and the like. Because the present comparison technique has the ability to generate output objects that encapsulate a portion of the original objects, the original objects may be first compared based on one set of properties and then later processed based on another set of properties that may not include any of the properties from the first set of properties or may include a portion of them. In addition, the difference indicator annotation allows the subsequent processing to select their own set of properties based on their own needs. Another advantage provided by outputting an object that encapsulates the original object is that the query and control methods exposed by the original object may be invoked on the output object. The operation of the comparison technique is now described in conjunction with the flow diagrams in FIGS. 16-23.

Figure 16:
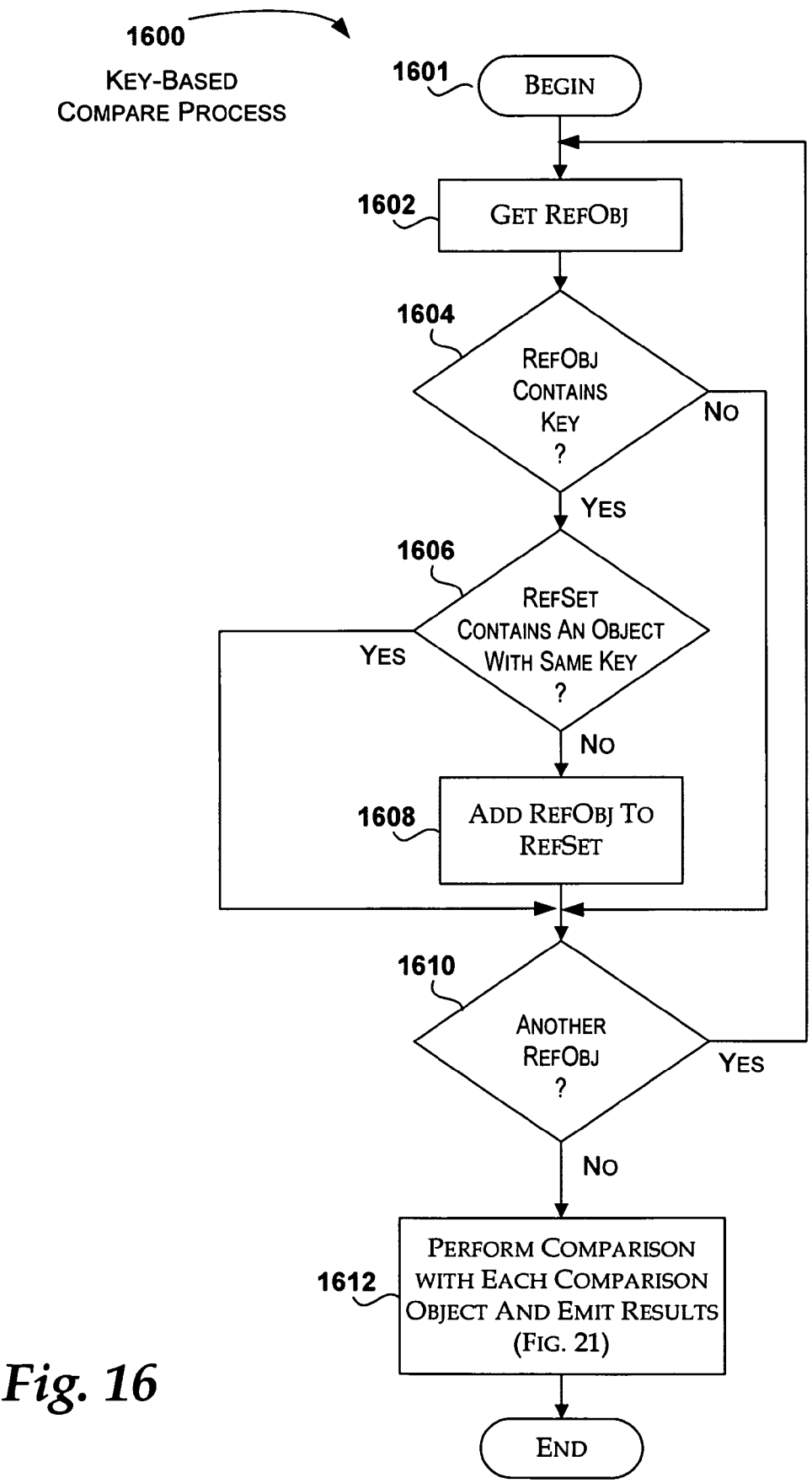
FIG. 16 is a logical flow diagram illustrating an exemplary process for performing a key-based comparison process.

FIG. 16 is a logical flow diagram illustrating an exemplary process for performing a key-based comparison process. The process begins at block 1601 and continues to block 1602.

At block 1602, a reference object is retrieved. The reference object is the object that other objects are compared against during the comparison process. Processing continues at decision block 1604.

At decision block 1604, a determination is made whether the reference object includes a property associated with the key-name that is specified with the KeyBased parameter. When there are multiple keys, the reference object includes a property associated with each of the multiple keys. If the reference object does not include the specified property, processing continues at decision block 1610. In a further refinement, before proceeding to block 1610, the reference object may be added to a list that will get emitted based on parameters specified with the command. Otherwise, processing continues at decision block 1606.

At decision block 1606, a reference set is reviewed to determine whether a reference object already exists within the reference set that has the same value for the key. If such a reference object exists, processing continues at decision block 1610. Otherwise, processing continues at block 1608.

At block 1608, the reference object is added to the reference set. Processing then continues at decision block 1610.

At decision block 1610, a determination is made whether there is another reference object to use in the comparison process. If there is another reference object, processing loops back to block 1602 and continues as described above. Otherwise, all the reference objects containing the specified key or keys have been added to the reference set. Processing continues at block 1612.

At block 1612, a comparison is performed using each reference object in the reference set and each available comparison object. Briefly, described in detail below in conjunction with FIG. 21, each property specified with the Property parameter is compared between the reference object and each comparison object. After this comparison is performed, processing is then complete.

Figure 21:
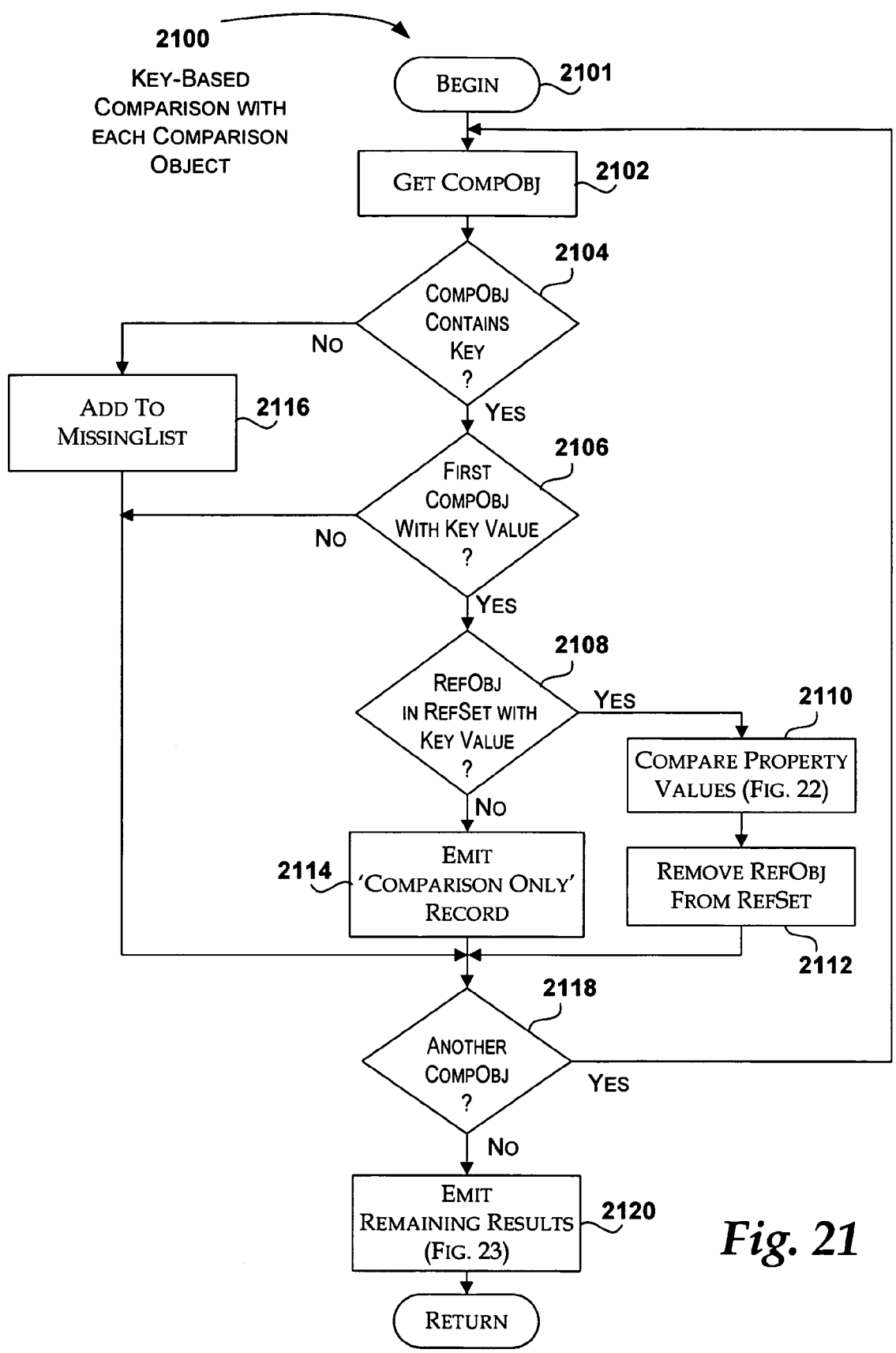
FIG. 21 is a flow diagram illustrating an exemplary process for performing a key-based comparison with each comparison object suitable for use in FIG. 16.

FIG. 21 is a flow diagram illustrating an exemplary process for comparing each comparison object with the reference object suitable for use in block 1612 of FIG. 16. Process 2100 begins at block 2101 and proceeds to block 2102.

At block 2102, a comparison object is obtained. As mentioned above, there may be multiple comparison objects. Thus, each comparison object is checked to see whether it should be compared against the reference object. Processing continues at decision block 2104.

At decision block 2104, a determination is made whether the comparison object has a property associated with a key-name. It is important to note that multiple keys may be used. If there are multiple keys, both the reference object and the comparison object must have the properties associated with the multiple keys. If the comparison object does not have a property associated with the key-name, processing continues to decision block 2116 where the comparison object is added to the missing list and processing continues at decision block 2118, described below. If the determination at block 2104 concludes that the comparison object does have the property associated with the key-name, processing continues at decision block 2106.

At decision block 2106, a determination is made whether the comparison object is the first comparison object with the key value. If it is not the first comparison object, processing also continues at decision block 2118. Otherwise, processing continues at decision block 2108.

At decision block 2108, a determination is made whether a reference object exists within the reference set that has the same key value. If such a reference object does not exist, processing continues at block 2114 where the comparison only record is emitted. The comparison only record indicates that a comparison object existed having a specific key, but a like reference object did not exist. As mentioned above, when comparing computing devices to a standard configuration, this information is useful to inform of a potential configuration problem. After the comparison only record is emitted, processing again continues at decision block 2118. However, if the outcome of decision block 2108 concludes that a reference object does exist, processing continues at block 2110.

At block 2110, the property values of the reference object and the comparison object are compared. Briefly, described in detail below in conjunction with FIG. 22, this comparison compares each property that is specified. Thus, as explained above, only properties of interest are compared instead of requiring each property to be compared. After the property values are compared, processing continues at block 2112.

At block 2112, the reference object is removed from the reference set. The reference object can be removed at this point because block 2106 checks whether the comparison object duplicates another comparison object that has already been processed. Removing the reference object facilitates enumeration later when emitting the results. Thus, after all the comparison objects have been retrieved and compared, if any reference object still exists in the reference set, this indicates a difference. Processing continues at decision block 2118.

At decision block 2118, a determination is made whether another comparison is available for processing. If there is another comparison object, processing loops back to block 2102 and continues as described above. However, once all the comparison objects have been processed, processing continues at block 2120.

At block 2120, the remaining results of the comparison are emitted. Briefly, described in detail below in conjunction with FIG. 23, the results that are emitted are based on switches specified in conjunction with the compare command. Processing is then complete.

Figure 22:
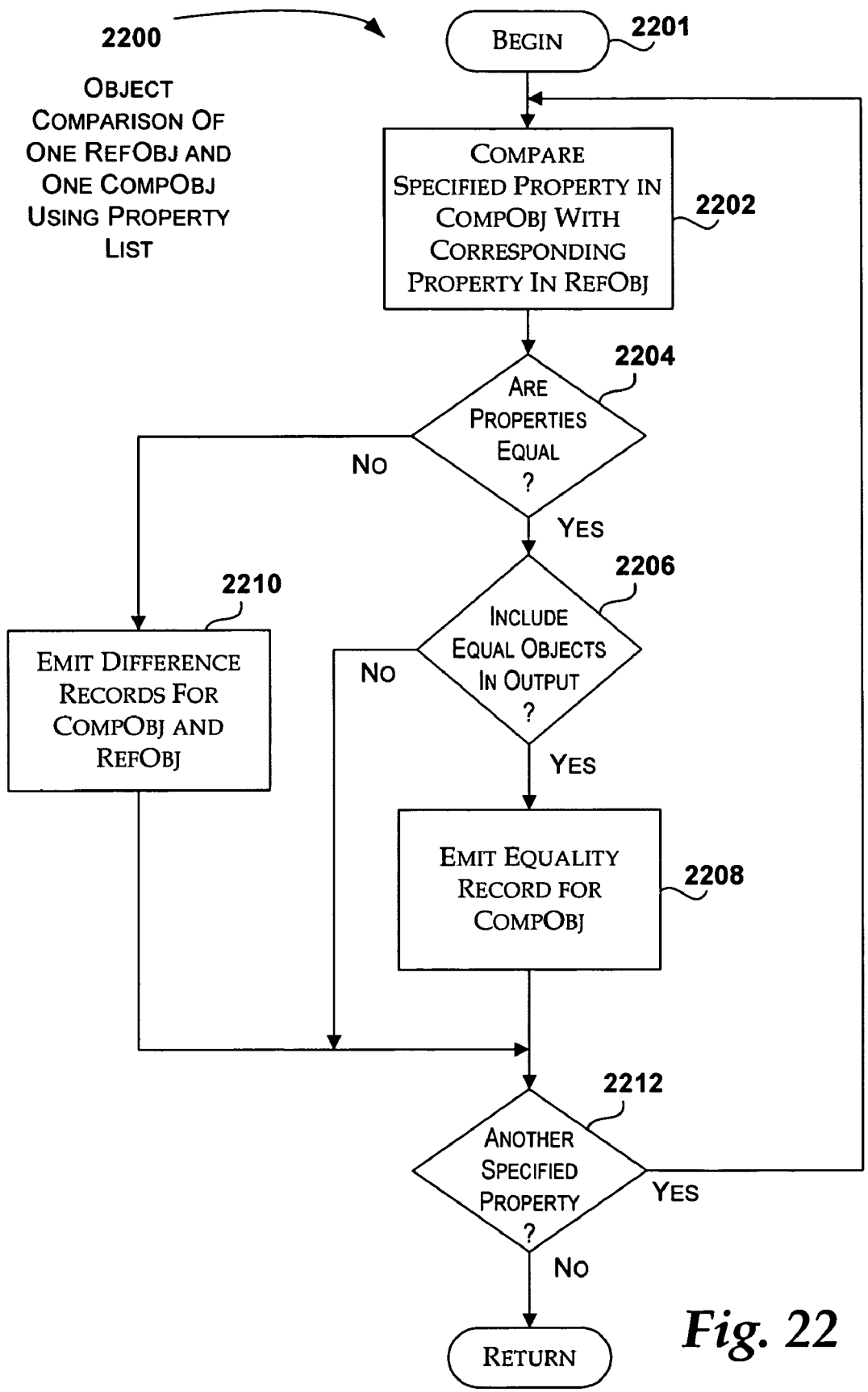
FIG. 22 is a flow diagram illustrating an exemplary process for comparing property values between a reference object and a comparison object suitable for use in FIG. 21.

FIG. 22 is a flow diagram illustrating an exemplary process for comparing property values between a reference object and a comparison object suitable for use in FIG. 21. The process begins at block 2201 and proceeds to block 2202.

At block 2202, one of the specified properties in the comparison object is compared with a corresponding property in the reference object. It is important to note that the data type of the reference object and comparison object do not necessarily need to be the same. If the data types are different, the extended type manager of the object-based administrative framework recognizes the different data types and converts them in a manner such that similar data types are compared. Thus, the comparison object may be converted to the data type of the reference object. Conversely, the reference object may be converted to the data type of the comparison object. In addition, each specified property may be individually converted in order to perform the comparison. Thus, the present comparison technique can compare objects of different types. The comparison technique treats the reference object as a virtual object that can be compared with the comparison object which is also treated as a virtual object.

It is also important to note that the compare may include a fuzzy comparison, such that the "values" for the properties in the reference object and the comparison object may be within a margin of error before reporting an error. For example, if the margin of error is set to 1 Mbyte, values of 10 MB and 12 MB produce a difference. However, the values of 10.5 MB and 11 MB do not produce a difference. This fuzzy comparison improves the signal to noise ratio. Thus, the comparison technique implementing the fuzzy comparison provides better and more significantly relevant difference detection.

The fuzzy comparison may be implemented using a custom comparer that is supplied as part of the command string, such as "-compare-object colorCompare -ReferenceObject $a -ComparisonObject $b". For this particular example, the colorCompare may compare textual strings storing different colors so that "moss green" and "sage" are reported as the same. Thus, the custom comparer allows great flexibility for performing comparisons between different objects. Once the specified property is compared, processing continues at decision block 2204. At decision block 2204, a determination is made whether the value of the property in the comparison object is equal to the value of the property in the reference object. If the values are not equal, processing continues at block 2210 where a difference record may be emitted that indicates the difference between the comparison object and the reference object with respect to the specified property. This difference record depends on the parameters specified with the compare command. Processing continues at decision block 2212. However, if the value of the property in the comparison object and the reference object are equal, processing continues at decision block 2206.

At decision block 2206, a determination is made whether the invocation of the compare command specified that equal objects were to be output. As mentioned above, one way in which this may be achieved is by utilizing the RecordEqual parameter 1420 shown in FIG. 14. If equal objects should not be included in the output, processing continues at decision block 2212. Otherwise, processing continues at block 2208.

At block 2208, an equality record is emitted for the comparison object. The equality record indicates the value and the property for the comparison object. Processing continues at decision block 2212.

At decision block 2212, a determination is made whether there is another specified property that needs to be compared. If there is another property, processing loops back to block 2202 and continues as described above. Otherwise, processing is complete and ends.

Figure 23:
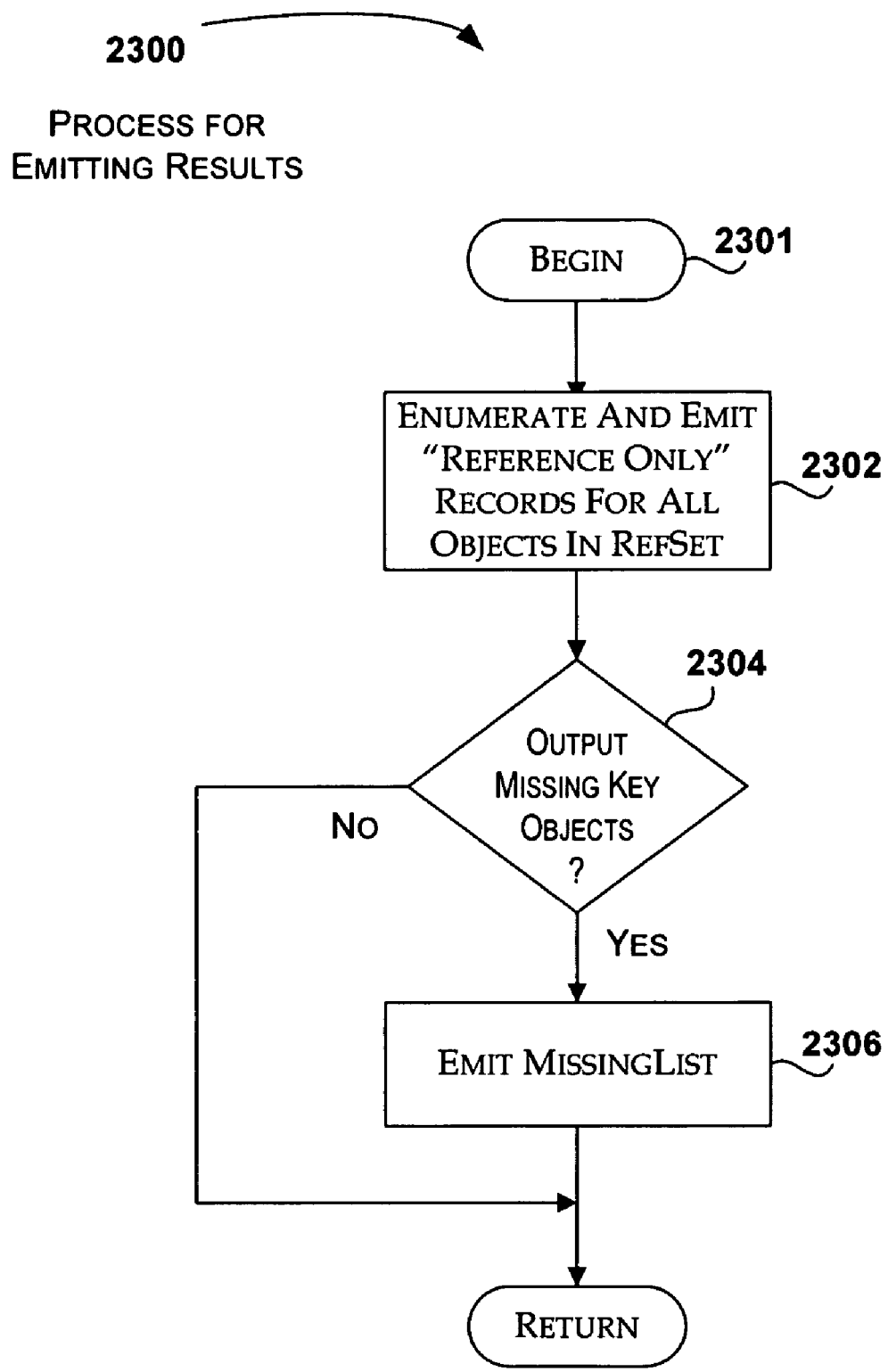
FIG. 23 is a flow diagram illustrating an exemplary process for emitting results suitable for use in FIG. 21.

FIG. 23 is a flow diagram illustrating an exemplary process for emitting results suitable for use in FIG. 21. Process 2300 begins at block 2301 and proceeds to block 2302.

At block 2302, the objects in the reference set are enumerated and the "reference only" records are emitted. Thus, this outputs the reference objects that did not have a corresponding comparison object. Processing continues at decision block 2304.

At decision block 2304, a determination is made whether the objects identified within the missing list should be output. If the missing key objects should not be output, processing is complete. Otherwise, processing continues at block 2306.

At block 2306, the reference objects identified within the missing list are emitted. Processing is then complete and returns.

Figure 17:
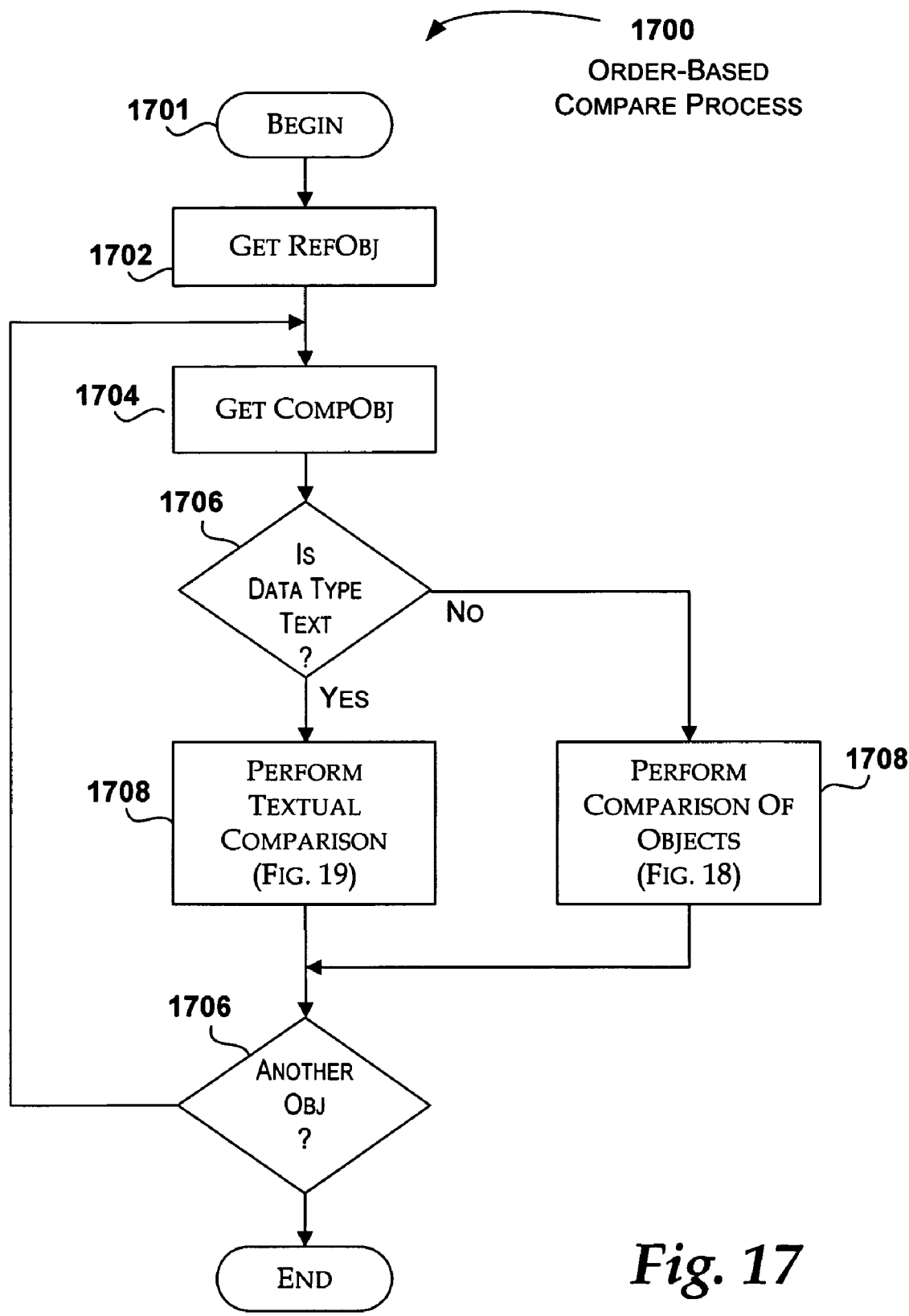
FIG. 17 is a logical flow diagram illustrating an exemplary process for performing an order-based comparison process.

FIG. 17 is a logical flow diagram illustrating an exemplary process for performing an order-based comparison process. For certain administrative tasks, an order-based comparison is preferred over a key-based comparison. For example, order-based comparison is preferred when comparing access control lists (ACLs). Because ACLs indicate the permission and access rights of users, the order for analyzing these rights is important. Processing begins at block 1701 and continues to block 1702.

At block 1702, a reference object is obtained. Processing continues at block 1704 where a comparison object is obtained. As mentioned above, the data type for the reference object and the comparison object need not be the same. The extended type manager handles any conversions that need to be performed before the comparison may occur. Processing continues as decision block 1706.

At decision block 1706, a determination is made whether the data type of the reference object and the comparison object is textual. If the data type is not textual (e.g., string, file), processing continues at block 1708.

At block 1708, a comparison is performed on the properties of the reference object and the comparison object. Briefly, described in detail below in conjunction with FIG. 18, the comparison of objects reports differences when properties of the reference object and the comparison object differ in value and/or differ in order. Processing continues at decision block 1706.

At decision block 1706, a determination is made whether there is another comparison object. If so, processing loops back to block 1704 and proceeds as described above. Otherwise, processing is complete.

Returning to decision block 1706, if the data type of the reference object and the comparison object is text, processing continues to block 1708.

At block 1708, text comparison is performed between the reference object and the comparison object. Briefly, described in detail below in conjunction with FIG. 19, the text comparison operates similar to standard text based comparison techniques currently available. Processing also continues to decision block 1706 and proceeds as described above.

While FIG. 17 does not illustrate multiple reference objects, one skilled in the art will appreciate that another decision block may be implemented to accommodate multiple reference objects.

Figure 18:
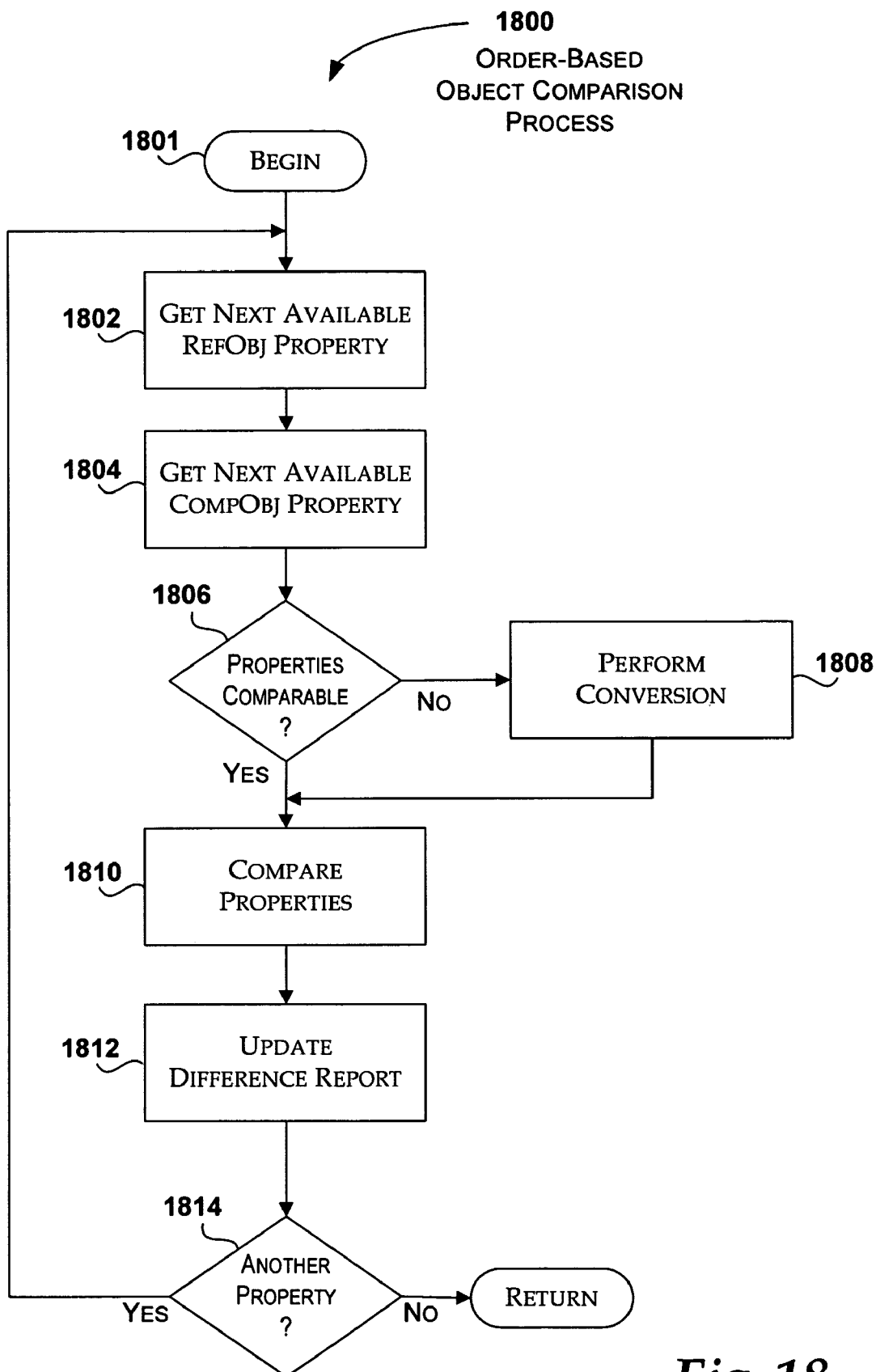
FIG. 18 is a logical flow diagram illustrating an order-based object comparison process suitable for use within the order-based comparison process shown in FIG. 17.

FIG. 18 is a logical flow diagram illustrating an order-based object comparison process suitable for use within the order-based comparison process shown in FIG. 17. Processing begins at block 1801 and proceeds to block 1802.

At block 1802, a property from the reference object is obtained. Because this comparison is order dependant, typically the properties are obtained in a sequential order. Processing continues at block 1804.

At block 1804, a property from the comparison object is obtained. The order in which the property in the comparison object is obtained occurs in the same order as that for obtaining the property in the reference object. Processing continues to decision block 1806.

At decision block 1806, a determination is made whether the reference property and the difference property are comparable. First, the process verifies that the name of the reference property is identical to the name of the difference property. This may be performed using reflection. In addition to reflection, the present comparison technique also provides for property aliasing as explained above in conjunction with the Extended Type System illustrated in FIG. 13. Thus, by using property aliasing, property names that are different in the reference object and the comparison object may be treated as equivalents during the comparison.

For example, some objects may use the property name "ProcessName" to identify a property associated with a name of a process. Other objects may use the property name "Name" to identify the property associated with the name of the process. By aliasing "Name" with "ProcessName", the properties of these two different objects will treated as the same during the comparison.

It is important to note that the extended type system may coerce a data type for one of the properties to be the same as the data type for the other property. For example, if the reference property is an integer data type and the comparison property is a string data type, the extended type manager may coerce the string into an integer value as described above in conjunction with FIG. 13. This is in contrast with a strict object comparison in which a difference would generate an error because of the different data types. If the properties are not immediately comparable with each other, processing continues at block 1808.

At block 1808, the necessary conversions are performed in order to allow the two properties to be compared. As mentioned above, this may involve coercing data types and the like. Once the properties are comparable, processing continues to block 1810.

At block 1810, the two properties are compared. As mentioned above, the comparison may utilize a custom comparison mechanism, perform a fuzzy comparison, and the like. Once the two properties are compared, processing continues to block 1812.

At block 1812, the difference is reported based on the switches provided with the command string. The difference may include differences in the values and/or in the order of the properties. Processing continues at decision block 1814.

At decision block 1814, a determination is made whether there is another property to compare. For an order-based comparison of objects, it is important to identify any differences between the values of the properties and/or the order of the properties. If there is another property, processing loops back to block 1802 and proceeds as described above. Otherwise, processing is complete.

Figure 19:
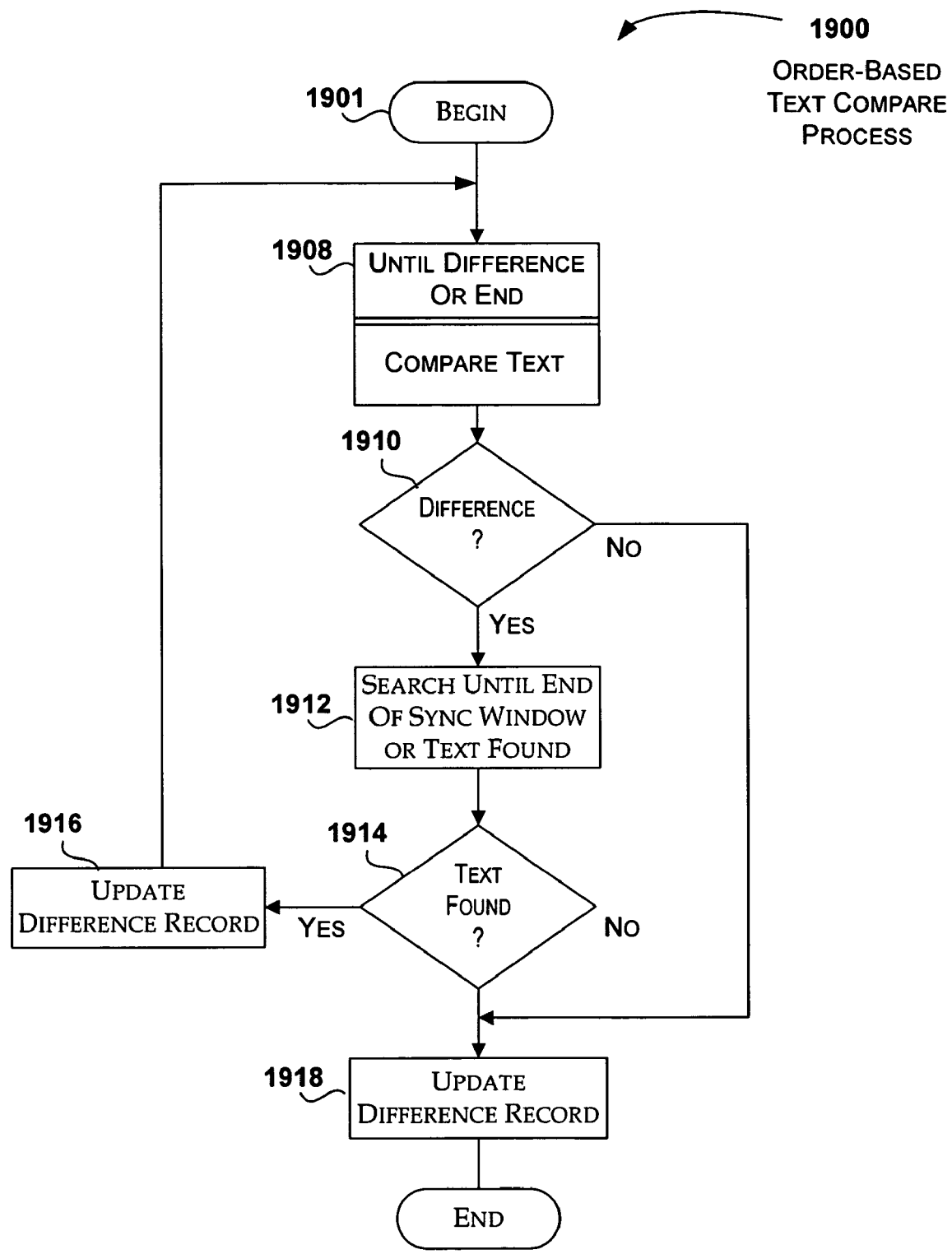
FIG. 19 is a logical flow diagram illustrating an order-based text comparison process suitable for use within the order-based comparison process shown n FIG. 17.

FIG. 19 is a logical flow diagram illustrating a textual compare process suitable for use within the order-based comparison process shown n FIG. 17. Processing begins at block 1901 and proceeds to block 1908.

At block 1908, text is compared until a difference is identified or until the end of the text. The text comparison may utilize well-known textual comparison techniques during block 1908. Once a difference is detected or the end is detected, processing continues to decision block 1910.

At decision block 1910, a determination is made whether the end of the text has been reached. If the end has been reached, processing continues to block 1918. Otherwise, processing continues to block 1912.

At block 1912, a search is performed for the text causing the difference. This search may be performed in either the text associated with the reference object or comparison object. The search is performed until the text is found or until a specified sync window is completed. The use of a sync window is well known to those skilled in the art and need not be further explained. Processing continues to decision block 1914.

At decision block 1914, a determination is made whether the text was found during the search. If the text was found, processing continues to block 1916 where the difference record is updated, such as by noting the added text in either the reference object or the comparison object. Processing then loops back to block 1908 and proceeds as described above.

If the text was not found at decision block 1914, processing continues to block 1918, where the difference record is updated with the information from the comparison. Processing is then complete.

Figure 20:
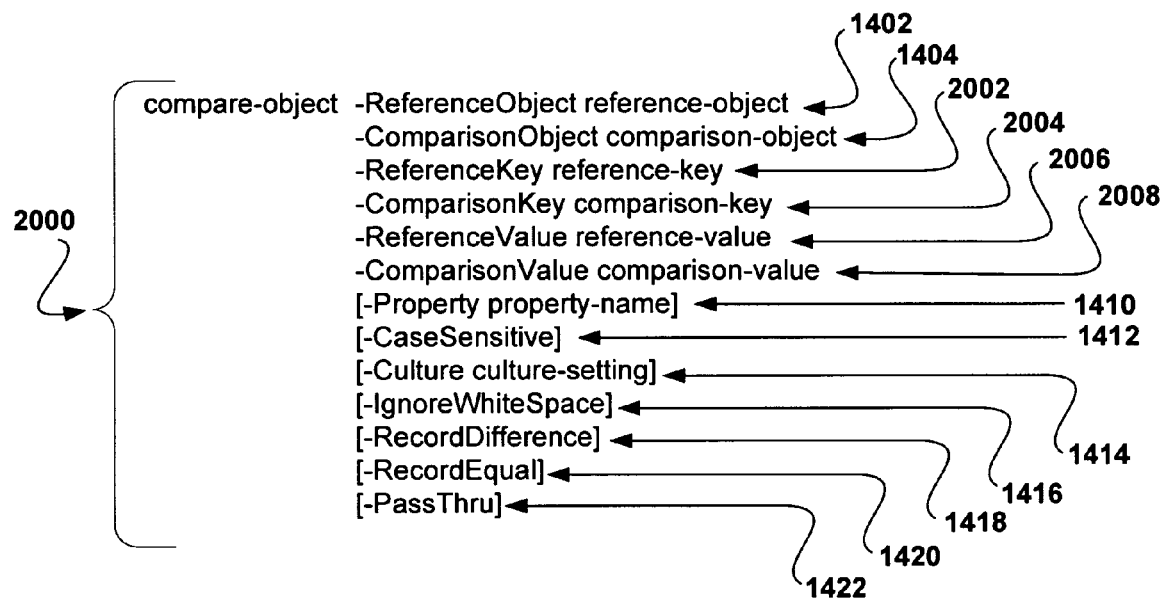
FIG. 20 illustrates another exemplary syntax for a compare cmdlet for implementing lambda expressions.

FIG. 20 illustrates another exemplary syntax for a compare cmdlet. Syntax 2000 supports lambda expressions. As an overview, lambda expressions allow the present comparison technique to compare two sets of objects based on keys and values that are derived from the properties of the reference object and/or comparison object, but which are not present on the objects themselves. Thus, the extended type system does not simply return a value, but rather allows processing to be performed in order to obtain the necessary values.

Syntax 2000 includes many of the parameters described above in conjunction with FIG. 14. In addition, syntax 2000 may include one or more of the following parameters: a ReferenceKey parameter 2002, a ComparisonKey parameter 2004, a ReferenceValue parameter 2006, and a ComparisonValue parameter 2008. Again, these parameters include a switch and may include data associated with the switch.

The ReferenceKey parameter 2002 includes a "-ReferenceKey" switch and a reference-key object. The reference-key object may be an arbitrary function, script, lambda expression, or the like (hereinafter collectively referred to as a lambda expression) that calculates the key for each reference object. Similarly, the ComparisonKey parameter 2004 includes a "-ComparisonKey" switch and a comparison-key object, where the comparison-key object may be a lambda express that calculates the key for each comparison object.

The ReferenceValue parameter 2006 includes a "-ReferenceValue" switch and a reference-value object. The reference-value object may be a lambda expression that calculates a value for each reference object. Similarly, the ComparisonValue parameter 2008 includes a "ComparisonValue" switch and a comparison-value object. The comparison-value object may be a lambda expression that calculates a value for each reference object.

The use of lambda expressions may best be understood by an example. Thus, assume that a command string contains a lambda expression for each of the above properties 2002-2008. Further, assume that each of the lambda expressions perform a database retrieval based on a property of the corresponding object. For example, the reference-key lambda expression associated with the ReferenceKey parameter 2002 may return a result of a database lookup on a property A. The comparison-key lambda expression associated with the ComparisonKey parameter 2004 may return a result of a database lookup on a property B. In pseudocode, the reference-key lambda expression may appear as: "{$db.fetch($_.A)}", where $db refers to the database object, .fetch($_.A) refers to retrieving property A via the fetch method from a single reference object in the input set using the extended type manager. Similarly, the pseudocode for the comparison-key lambda expression may appear as: "{$db.fetch($_.B)}".

Thus, during the processing described above in conjunction with FIGS. 16-19, and 23, whenever the key is obtained and evaluated, the corresponding key lambda expression is applied. The test for key equality utilizes the same rules as discussed above. However, another lambda expression may be specified which will perform the actual comparisons between the keys.

Then, for each reference object and comparison object that has matching keys, the compare cmdlet applies the corresponding value lambda expressions. For example, if the reference-value lambda expression is "{$db.fetch($_.C)}" and the comparison-value lambda expression is "{$db.fetch($_.D)}", the compare-cmdlet will compare the result of $db.fetch($R.C) to the result of $db.fetch($C.D), where $R is the reference object and $C is the comparison object. Again, the comparison may utilize the comparison process described above which includes performing an optional value comparison lambda expression.

In another embodiment that supports lambda expressions, the reference objects and comparison objects may be filtered in such a way that the calculated keys and values from the lambda expressions are added as notes on the input objects. These and other variations for specifying lambda expressions to support the present comparison technique provide great flexibility when identifying errors.

Thus, by using lambda expressions, reference objects that have different object types and no common properties may be compared as long as the key function for each reference object generates compatible results and the value function for each reference object generates comparable results. In addition, the key or value function used for each object may be an arbitrarily complex calculation that may invoke external system capabilities (e.g., database lookups) and perform network operations to retrieve data from remote systems. In a further refinement, the key or value function may provide aliasing capability that allows comparison of semantically identical properties that use different names.

The output object that is generated when a lambda expression is specified may include the calculated keys and calculated values as either part of the generated object or as annotations to the original objects in the pass-through mode. This allows the generated output to be further processed using the calculated values. In another refinement, the key function may operate to return null for data that should be excluded from the input data.

By applying lambda expressions, comparisons may span multiple input sets (e.g., reference objects) by using the output of one comparison performed in pass-through mode as the input to another comparison. When this is done, the name or value of the property indicating the source of the object may vary. This allows the tracking of differences among an arbitrary group of input sets. In another variation, the comparisons may span multiple input sets by combining multiple input sets in a single stream.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. At least one computer-readable storage medium having computer executable instructions for performing a method, comprising:
obtaining a reference object;
obtaining at least one comparison object; and
performing a comparison between the reference object and the at least one
comparison object based on at least one parameter specified within a command string
in an object-based environment, wherein the at least one parameter comprises a keybased
switch and a key-word, the key-word specifying an expression on the command
string, the expression generating a reference-key associated with the reference object,
and the comparison being performed after confirming that the reference-key and a
comparison-key associated with the comparison object match.

2. The computer-readable medium storage of claim 1, wherein the at least one comparison object is generated from a cmdlet executing in the
object-based environment.

3. The computer-readable storage medium of claim 1, wherein the at least one parameter comprises a key-based switch and a key-word, and
the comparison is performed after confirming that the reference object and the
comparison object contain a property associated with the key-word.

4. The computer-readable storage medium of claim 1, wherein the at least one parameter comprises a property switch and at least one
property, and the comparison is only performed on the at least one property.

5. The computer-readable storage medium of claim 1, wherein the at least one parameter comprises an order switch, and the comparison is
performed in an order-based manner.

6. The computer-readable storage medium of claim 5, wherein the reference object and the at least one comparison object comprise a textual
data type and the comparison comprises a textual comparison.

7. The computer-readable storage medium of claim 6, wherein the at least one parameter further comprises a case-sensitive switch and the
textual comparison is case-sensitive.

8. The computer-readable storage medium of claim 6, wherein the at least one parameter further comprises a white-space switch and the
textual comparison excludes white space when comparing the reference object and the
comparison object.

9. The computer-readable storage medium of claim 5, wherein the reference object and the at least one comparison object comprise a nontextual
data type and the comparison compares a reference value of a property of the
reference object with a comparison value of a corresponding property of the
comparison object.

10. The computer-readable storage medium of claim 1, further comprising generating an output record based on the at least one parameters and
the comparison.

11. The computer-readable storage medium of claim 10, wherein the output record includes differences between the reference object and the
comparison object.

12. The computer-readable storage medium of claim 10, wherein the output record encapsulates the reference object and differences identified
during the comparison are added as annotations to the output record.

13. The computer-readable storage medium of claim 10, wherein the output record encapsulates the comparison object and differences
identified during the comparison are added as annotations to the output record.

14. The computer-readable storage medium of claim 1, wherein the comparison comprises a custom comparison that is specified as an
expression in the command string.

15. The computer-readable storage medium of claim 1, wherein a reference value of the reference object is generated by an expression that is
specified in the command string, the reference value being compared with a compare
value associated with the comparison object during the comparison.

16. The computer-readable storage medium of claim 1, wherein a compare value of the comparison object is generated by an expression that is
specified in the command string, the comparison value being compared with a
reference value associated with the reference object during the comparison.

17. The computer-readable storage medium of claim 1, wherein the reference object is of a first data type and the comparison object is of a
second data type and at least one of the data types is coerced so that the reference
object and the comparison object have a same data type before performing the
comparison.

18. A computer-readable storage medium having computer-executable instructions, the instructions comprising:
identifying a compare cmdlet within a command string in an object-based
environment;
obtaining a reference object based on a reference object specification within the
command string;
obtaining a comparison object based on a comparison object specification
within the command string; and
performing a comparison between the reference object and the comparison
object based on at least one parameter specified within the command string, wherein the at least one parameter comprises a key-based switch and a key-word, the key-word specifying an expression on the command string, the expression generating a reference-key associated with the reference object, and the comparison being performed after confirming that the reference-key and a comparison-key associated with the comparison object match.

19. The computer-readable storage medium of claim 18, further comprising generating a difference record as a result of the comparison.

20. The computer-readable storage medium of claim 19, wherein the difference record is provided as input to another cmdlet that is pipelined from the compared cmdlet.

21. The computer-readable storage medium of claim 18, further comprising obtaining an expression within the command string, the expression identifying the comparison to perform between the reference object and the comparison object.

22. The computer-readable storage medium of claim 18, further comprising obtaining an expression within the command string, the expression generating a key-word that identifies a property of the reference object that is necessary in order for the comparison to be performed.

23. The computer-readable storage medium of claim 18, further comprising obtaining an expression within the command string, the expression generating a reference value for the reference object, the reference value being compared to a comparison value associated with the comparison object during the comparison.

24. The computer-readable storage medium of claim 18, further comprising obtaining specified properties, the specified properties identifying specific properties of the reference object and the comparison object that are compared when performing the comparison.

25. The computer-readable storage medium of claim 18, wherein the comparison is performed in an order-based manner.

26. The computer-readable storage medium of claim 18, wherein the reference object is of a first data type and the comparison object is of a second data type, and the reference object is coerced to the second data type before the comparison.

27. The computer-readable storage medium of claim 18, wherein the reference object is a first data type and the comparison object is of a second data type, and the comparison object is coerced to the first data type before the comparison.

28. The computer-readable storage medium of claim 18, wherein the reference object is a first data type and the comparison object is of a second data type, and the reference object and the comparison object are coerced to have a same data type before the comparison.

29. A system comprising:

a processor; and a memory into which a plurality of instructions are loaded, the plurality of instructions performing a method comprising:

obtaining a reference object;

obtaining at least one comparison object; and confirming that a reference-key and a comparison-key associated with the at least one comparison object match;

performing a comparison between the reference object and the at least one comparison object based on at least one parameter specified within a command string in an object-based environment after confirming that the reference-key and the comparison-key match, wherein the at least one parameter comprises a key-based switch and a key-word, wherein the key-word specifies an expression on the command string; and generating the reference-key with the expression on the command string.

30. The system of claim 29, wherein the at least one comparison object is generated from a cmdlet executing in the object-based environment.

31. The system of claim 29, wherein the comparison is performed after confirming that the reference object and the comparison object contain a property associated with a the key-word specified on the command string.

32. The system of claim 29, wherein the at least one parameter comprises a property switch and at least one property, and the comparison is only performed on the at least one property in the reference object and the comparison object.

33. The system of claim 29, wherein the at least one parameter comprises an order switch, and the comparison is performed in an order-based manner.

34. The system of claim 29, further comprising generating an output record based on the at least one parameters and the comparison.

35. The system of claim 33, wherein the output record includes differences between the reference object and the comparison object.

36. The system of claim 34, wherein the output record encapsulates the reference object and differences identified during the comparison are added as annotations to the output record.

37. The system of claim 29, wherein the comparison comprises a custom comparison that is specified as an expression in the command string.

38. The system of claim 29, wherein a reference value of the reference object is generated by an expression that is specified in the command string, the reference value being compared with a compare value associated with the comparison object during the comparison.

39. The system of claim 29, wherein the reference object is of a first data type and the comparison object is of a second data type and at least one of the data types is coerced so that the reference object and the comparison object have a same data type before performing the comparison.

40. The computer-readable storage medium of claim 18, wherein the cmdlet includes commands that are used within an administrative tool environment.

* * * * *